(12) United States Patent
Sasaki et al.

(10) Patent No.: US 7,183,014 B2
(45) Date of Patent: Feb. 27, 2007

(54) BATTERY PACK

(75) Inventors: Hiroshi Sasaki, Miyagi (JP); Takayuki Inoi, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 548 days.

(21) Appl. No.: 10/387,521

(22) Filed: Mar. 14, 2003

(65) Prior Publication Data
US 2003/0180606 A1    Sep. 25, 2003

(30) Foreign Application Priority Data
Mar. 20, 2002   (JP) ............................. 2002-079802

(51) Int. Cl.
H01M 16/00    (2006.01)
H01M 6/50    (2006.01)

(52) U.S. Cl. ................. 429/7; 429/9; 429/61
(58) Field of Classification Search ............. None
See application file for complete search history.

(56) References Cited

U.S. PATENT DOCUMENTS

| 5,821,007 A | 10/1998 | Harshe et al. | |
| 5,849,426 A * | 12/1998 | Thomas et al. | 429/7 |
| 2002/0114982 A1 * | 8/2002 | Putt et al. | 429/3 |

FOREIGN PATENT DOCUMENTS

| EP | 07220701 | 8/1995 |
| EP | 08162080 | 6/1996 |
| EP | 1 168 467 | 1/2001 |
| EP | 2001313047 | 11/2001 |
| EP | 2003086156 | 3/2003 |
| WO | WO 99/43095 | 8/1999 |

OTHER PUBLICATIONS

European Search Report dated Jun. 18, 2004, published with EP 1347531, Sep. 24, 2003.
Canadian Office Action dated May 26, 2006.
Taiwanese Office Action dated Jun. 24, 2004 with English translation of pertinent portions.
3. Kazimierczuk et al. "Application of Super Capacitors for Voltage Regulation in Aircraft Distributed Power Systems" pp. 835-841 (PESC '96 Record, 27th Annual IEEE, vol. 1, 23-27, Jun. 1996).

* cited by examiner

*Primary Examiner*—Jonathan Crepeau
(74) *Attorney, Agent, or Firm*—Whitham, Curtis Christofferson & Cook, PC

(57) ABSTRACT

A battery pack is provided which can be suitably used in a case where charging of a dedicated secondary battery in a portable terminal device is difficult. The battery pack is mounted in a battery mounting section in a portable cellular phone (portable terminal device) proper. In the battery pack, alkaline accumulators are connected in series. Alkaline accumulators generate electromotive forces having a voltage (3V) being lower than that of the dedicated secondary battery. A power source circuit has a boosting-type DC/DC converter which boosts a voltage of the alkaline accumulators being connected in series at a level being same as that of the dedicated secondary battery (for example, 4.5V), and outputs the boosted voltage. An electrical double layer capacitor has a capacity to feed stable power to an internal circuit in which power consumption increases or decreases in a burst manner and is charged by application of an output of the power source circuit and stores the power.

10 Claims, 15 Drawing Sheets

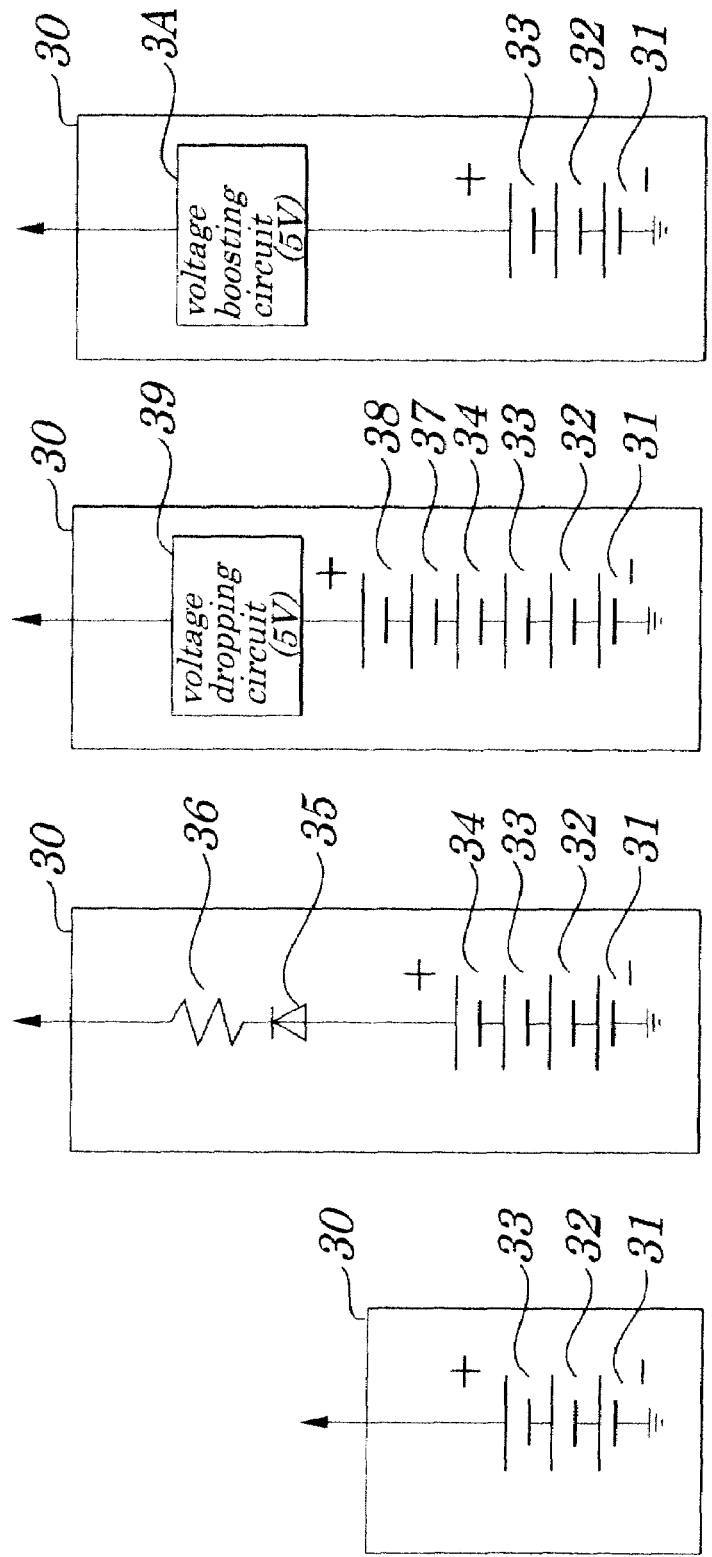

BATTERY PACK

BACKGROUND OF THE INVENTION

1. Field of the Invention

The present invention relates to a battery pack and more particularly to the battery pack that can be suitably used for a portable terminal device such as a portable cellular phone being carried by for example a user who is on the road over an extended period of time.

The present application claims priority of Japanese Patent Application No. 2002-079802 filed on Mar. 20, 2002, which is hereby incorporated by reference.

2. Description of the Related Art

Generally, a portable terminal device such as a portable cellular phone 1 is so configured as to operate using its dedicated secondary battery 20. For example, as shown in FIGS. 12A and 12B, the portable cellular phone 1 is made up of a main body of portable cellular phone 10 and the dedicated secondary battery 20. As shown in FIGS. 12A and 12B, the main body of portable cellular phone 10 has a battery mounting section 11, a multifunctional connector 12, terminals 13a and 13b, and an antenna 14. The dedicated secondary battery 20 is mounted in the battery mounting section 11. To the multifunctional connector 12 are connected a charging adapter used to charge the dedicated secondary battery 20, a personal computer, or a like. The terminals 13a and 13b are coupled to terminals 21a and 21b (not shown) of the dedicated secondary battery 20 used to take in electromotive force of the dedicated secondary battery 20. The antenna 14 is adapted to transmit and receive radio waves to and from a radio base station (not shown).

When the dedicated secondary battery 20 is discharged, if a user stays indoors and commercial power supply is available, the charging adapter is connected to the multifunctional connector 12 to charge the dedicated secondary battery 20. Moreover, when commercial power supply is not available in such a case where a user stays outdoors, conventionally, as shown in FIG. 13A, a battery pack 30 is connected to the multifunctional connector 12 to charge the dedicated secondary battery 20. The battery pack 30 serves as a simple charger or an emergency power source. The main body of portable cellular phone 10, as shown in FIG. 13B, includes a charge controlling circuit 40 and the internal circuit 50. The charge controlling circuit 40 feeds electromotive force of the battery pack 30 through terminals 13a and 13b and terminals 21a and 21b to the dedicated secondary battery 20 at a constant current and at a constant voltage for charging. Power of the dedicated secondary battery 20 is fed to an internal circuit 50 to perform main operations of a TDMA (Time Division Multiple Access)—type portable cellular phone.

FIGS. 14A, 14B, 14C, and 14D are circuit diagrams showing electrical configurations of the battery pack 30 in FIGS. 13A and 13B. Each symbol of batteries shown in FIGS. 14A, 14B, 14C, and 14D represents a cell unit of a battery and one cell has electromotive force of 1.5V.

The battery pack 30 shown in FIG. 14A is made up of three serially connected battery cells each having a voltage of 1.5 V for example, three pieces of alkaline accumulators) 31, 32, and 33. The battery pack 30 shown in FIG. 14B is made up of four battery cells 31, 32, 33, and 34 (for example, four pieces of alkaline accumulators, two pieces of serially-connected manganese dioxide lithium batteries each having a voltage of 3.0 V, or a like) each having a voltage of 1.5 V, a diode 35 for preventing backflow of a current, and a resistor 36 for limiting currents, being connected in series. The battery pack 30 shown in FIG. 14C is made up of six serially-connected battery cells 31, 32, 33, 34, 37, and 38 (for example, six pieces of alkaline accumulators, three manganese dioxide lithium batteries each having a voltage of 3V, one square-shaped stacked alkaline accumulator having a voltage of 9V, or a like) each having a voltage of 1.5 V, and a voltage dropping circuit 39 adapted to drop a voltage of the battery cells from 9V to 5V, all of which are connected in series. The battery pack 30 shown in FIG. 14D is made up of three battery cells each having a voltage that has come nearer to a final level and a voltage boosting circuit 3A adapted to boost the voltage of the battery cell up to a level of 5V, both being connected in series.

FIG. 15 is a circuit diagram showing electrical configurations of a charge controlling circuit 40 shown in FIGS. 13A and 13B. The charge controlling circuit 40 includes a current limiting circuit 41, a voltage limiting circuit 42, a limiting-type selecting switch 43, and a voltage detector 44. The current limiting circuit 41 limits a current flow of power to be fed from an AC adapter (adapter for charging) 60 adapted to convert a voltage (AC100V) of commercial power supply to DC 6V or from the battery pack 30 to a level that can be suitably used for charging the dedicated secondary battery 20 and outputs it. The voltage limiting circuit 42 limits a voltage of power to be fed from the AC adapter 60 or from the battery pack 30 to a level (for example, 4.5V) that can be suitably used for charging the dedicated secondary battery 20 and outputs it.

The limiting-type selecting switch 43 is used to select, based on a selecting signal SL output from the voltage detector 44, a power M of the current limiting circuit 41 and a power N of the voltage limiting circuit 42 and outputs the selected power. The voltage limiting circuit 42 outputs a voltage of a power Q output from the limiting-type selecting switch 43 and detects it and, based on a result from the selection, outputs the selecting signal SL. In this case, if a voltage of the power Q is higher than that being suitably used for charging the dedicated secondary battery 20, the power N of the voltage limiting circuit 42 is selected by the selecting signal SL, and if the voltage of the power Q is lower than that being suitably used for charging the dedicated secondary battery 20, the power M of the current limiting circuit 41 is selected by the selecting signal SL.

In the conventional portable cellular phone 1, when the battery pack 30 is connected to the multifunctional connector 12, the dedicated secondary battery 20 is charged at a constant current and at a constant voltage fed from the battery pack 30 through the charge controlling circuit 40, terminals 13a and 13b, and terminals 21a and 21b, and an electromotive force of the dedicated secondary battery 20 is supplied to the internal circuit 50. Operations of the TDMA-type portable cellular phone 1 are performed in the internal circuit 50. Moreover, when the AC adapter 60, instead of the battery cell 30, is connected to the multifunctional connector 12, the dedicated secondary battery 20 is charged at a constant current and at a constant voltage fed from the AC adapter 60 through the charge controlling circuit 40, terminals 13a and 13b, and terminals 21a and 21b.

However, the above conventional battery pack 30 has following problems to be solved. That is, when a user goes the outdoors carrying the portable cellular phone 1 and the dedicated secondary battery 20 is already discharged and when commercial power is not available because the user is outdoors, the user has to perform charging the portable cellular phone 1 by using the battery pack 30, however, in this case, it will be time before a voltage of the portable cellular phone 1 reaches a specified level according to a state of the dedicated secondary battery 20 and therefore the portable cellular phone 1 does not operate immediately even after the connection of the battery pack 30. Another problem is that, since the dedicated secondary battery 20 makes up part of components of a power source section of the portable cellular phone 1, if a failure occurs in the dedicated secondary battery 20, the portable cellular phone 1 cannot be operated even by the connection of the battery pack 30.

Moreover, there is still another problem that, since the charge controlling circuit 40 is configured assuming that the dedicated secondary battery 20 is charged, if the dedicated secondary battery 20 is lost, the charge controlling circuit 40 does not operate normally in some cases and, as a result, a voltage required to normally operate the portable cellular phone 1 cannot be obtained even by the connection of the battery pack 30. Also, still another problem is that, since a voltage required for operating the charge controlling circuit 40 is 4V, it is necessary for the battery pack 30 to have at least three battery cells (each having a voltage of 1.5V) being connected in series, which thus causes a user to feel that the portable cellular phone 1 is heavy to carry. Furthermore, the conventional portable cellular phone presents another problem in that, when the battery pack 30 is connected to its multifunctional connector 12, other devices such as personal computers or a like cannot be connected to the multifunctional connector 12.

To solve these problems, a method is thought to be available in which another dedicated secondary battery having the same function as that of the dedicated secondary battery 20 and being in a fully-charged state is carried as a backup cell. However, this method has a problem in that not only carrying the dedicated secondary battery is attended with risk of occurrence of a short circuit but also buying such the backup dedicated secondary battery is costly. Moreover, in this case, a user has to carry an AC adapter required to charge such the dedicated backup second battery. Also, since the portable cellular phone 1 is operated according to the TDMA communication method, a judgement as to whether a voltage of the dedicated secondary battery 20 has reached its final voltage is made based on a voltage value that has dropped when power consumption increases or decreases in a burst manner. As a result, in some cases, a message that the voltage has reached its final level even in a state where a discharging depth of the dedicated secondary battery 20 is shallow (that is, battery capacity is still residual somewhat) appears on a displaying section of the portable cellular phone 1, which presents another problem that battery capacity cannot be used to the fullest.

SUMMARY OF THE INVENTION

In view of the above, it is an object of the present invention to provide a battery pack which is capable of operating a portable cellular phone immediately even when a dedicated secondary battery is discharged.

According to a first aspect of the present invention, there is provided a battery pack being placed in a portable terminal device in a manner so as to be replaceable with a dedicated secondary battery for being used as a power source of the portable terminal device including: a primary battery to generate a specified electromotive force; and a package to house the primary battery.

In the foregoing first aspect, a preferable mode is one wherein the package, instead of the dedicated secondary battery, is configured to be placed in the portable terminal device and is provided with terminals to feed the specified electromotive force of the primary battery or the fuel cell to the portable terminal device.

Also, a preferable mode is one that wherein further includes a power storing unit to be charged by application of a voltage output from the primary battery or the fuel cell, hereby storing fed power, and to feed the stored power to the portable terminal device, wherein the a package houses the primary battery or the fuel cell and the power storing unit.

Also, a preferable mode is one wherein the power storing unit is made up of an electrical double layer capacitor.

Also, a preferable mode is one that wherein further includes a current limiting circuit to limit a current of input the specified electromotive force of the primary battery or the fuel cell to a level being a predetermined value or less, wherein the a package houses the primary battery or the fuel cell, the power storing unit and the current limiting circuit.

Also, a preferable mode is one that wherein further includes a voltage boosting unit to boost a voltage level of the specified electromotive force fed from the primary battery or the fuel cell to a voltage level of the dedicated secondary battery; and, wherein the power storing unit is charged by application of a voltage output from the voltage boosting unit, hereby storing fed power, and feed the stored power to the portable terminal device, and wherein the a package houses the primary battery or the fuel cell, the power storing unit and the voltage boosting unit.

Also, a preferable mode is one wherein the voltage boosting unit includes a Direct Current/Direct Current (DC/DC) converter.

Also, a preferable mode is one wherein the electrical double layer capacitor has an equivalent serial resistance being lower than that of the primary battery or the fuel cell.

Also, a preferable mode is one wherein the electrical double layer capacitor has a capacity being able to feed stable power to the portable terminal device in which power consumption increases or decreases in a burst manner.

According to a second aspect of the present invention, there is provided a battery pack being placed in a portable terminal device in a manner so as to be replaceable with a dedicated secondary battery for being used as a power source of the portable terminal device including:

a primary battery to generate electromotive force;

a current limiting circuit to limit a current of input electromotive force of the primary battery to a level being a predetermined value or less; and a voltage boosting unit to boost a voltage of the electromotive force of the primary battery fed from the current limiting circuit to a voltage level of the dedicated secondary battery and to feed boosted voltage to the portable terminal device.

According to a third aspect of the present invention, there is provided a battery pack being placed in a portable terminal device in a manner so as to be replaceable with a dedicated secondary battery for being used as a power source of the portable terminal device including:

a primary battery to generate electromotive force;

a current limiting circuit to limit a current of input electromotive force of the primary battery to a level being a predetermined value or less;

a Direct Current/Direct Current (DC/DC) converter to boost a voltage of the electromotive force of the primary battery fed from the current limiting circuit to a voltage level of the dedicated secondary battery and to feed boosted voltage to the portable terminal device;

a package to house the primary battery, the current limiting unit, and the DC/DC converter; and wherein the package, instead of the dedicated secondary battery, is configured to be placed in the portable terminal device and is provided with terminals to feed power output from the DC/DC converter to the portable terminal device.

According to a fourth aspect of the present invention, there is provided a battery pack being placed in a portable terminal device in a manner so as to be replaceable with a dedicated secondary battery for being used as a power source of the portable terminal device including:

a primary battery to generate electromotive force.;

a current limiting circuit to limit a current of input electromotive force of the primary battery to a level being a predetermined value or less;

a voltage boosting unit to boost a voltage of the electromotive force of the primary battery fed from the current limiting circuit to a voltage level of the dedicated secondary battery; and a power storing unit to be charged by application of a voltage output from the voltage boosting unit, hereby storing fed power, and to feed the stored power to the portable terminal device.

According to a fifth aspect of the present invention, there is provided a battery pack being placed in a portable terminal device in a manner so as to be replaceable with a dedicated secondary battery for being used as a power source of the portable terminal device including:

a primary battery to generate electromotive force;

a current limiting circuit to limit a current of input electromotive force of the primary battery to a level being a predetermined value or less;

a Direct Current/Direct Current (DC/DC) converter to boost the voltage of the electromotive force of the primary battery fed from the current limiting circuit to a voltage level of the dedicated secondary battery;

a power storing unit to be charged by application of a voltage output from the DC/DC converter and to store fed power and to feed the stored power to the portable terminal device;

a package to house the primary battery, the current limiting circuit, the DC/DC converter, and the power storing unit; and wherein the package, instead of the dedicated secondary battery, is configured to be placed in the portable terminal device and is provided with terminals to feed the power being accumulated in the power storing unit to the portable terminal device.

According to a sixth aspect of the present invention, there is provided a battery pack being placed in a portable terminal device in a manner so as to be replaceable with a dedicated secondary battery for being used as a power source of the portable terminal device including: a fuel cell to generate a specified electromotive force; and a package to house the fuel cell.

According to a seventh aspect of the present invention, there is provided a battery pack being placed in a portable terminal device in a manner so as to be replaceable with a dedicated secondary battery for being used as a power source of the portable terminal device including:

a fuel cell to generate electromotive force;

a current limiting circuit to limit a current of input electromotive force of the fuel cell to a level being a predetermined value or less; and a voltage boosting unit to boost a voltage of the electromotive force of the fuel cell fed from the current limiting circuit to a voltage level of the dedicated secondary battery and to feed boosted voltage to the portable terminal device.

According to an eighth aspect of the present invention, there is provided a battery pack being placed in a portable terminal device in a manner so as to be replaceable with a dedicated secondary battery for being used as a power source of the portable terminal device including:

a fuel cell to generate electromotive force;

a current limiting circuit to limit a current of input electromotive force of the fuel cell to a level being a predetermined value or less;

a Direct Current/Direct Current (DC/DC) converter to boost a voltage of the electromotive force of the fuel cell fed from the current limiting circuit to a voltage level of the dedicated secondary battery and to feed boosted voltage to the portable terminal device;

a package to house the fuel cell, the current limiting unit, and the DC/DC converter; and wherein the package, instead of the dedicated secondary battery, is configured to be placed in the portable terminal device and is provided with terminals to feed power output from the DC/DC converter to the portable terminal device.

According to a ninth aspect of the present invention, there is provided a battery pack being placed in a portable terminal device in a manner so as to be replaceable with a dedicated secondary battery for being used as a power source of the portable terminal device including:

a fuel cell to generate electromotive force;

a current limiting circuit to limit a current of input electromotive force of the fuel cell to a level being a predetermined value or less;

a voltage boosting unit to boost a voltage of the electromotive force of the fuel cell fed from the current limiting circuit to a voltage level of the dedicated secondary battery; and a power storing unit to be charged by application of a voltage output from the voltage boosting unit, hereby storing fed power, and to feed the stored power to the portable terminal device.

According to a tenth aspect of the present invention, there is provided a battery pack being placed in a portable terminal device in a manner so as to be replaceable with a dedicated secondary battery for being used as a power source of the portable terminal device including:

a fuel cell to generate electromotive force;

a current limiting circuit to limit a current of input electromotive force of the fuel cell to a level being a predetermined value or less;

a Direct Current/Direct Current (DC/DC) converter to boost the voltage of the electromotive force of the fuel cell fed from the current limiting circuit to a voltage level of the dedicated secondary battery;

a power storing unit to be charged by application of a voltage output from the DC/DC converter and to store fed power and to feed the stored power to the portable terminal device;

a package to house the fuel cell, the current limiting circuit, the DC/DC converter, and the power storing unit; and wherein the package, instead of the dedicated secondary battery, is configured to be placed in the portable terminal device and is provided with terminals to feed the power being accumulated in the power storing unit to the portable terminal device.

With the above configurations, since a battery pack is placed in a portable terminal device instead of a dedicated secondary battery, power being stored in an electrical double layer capacitor (power storing section) is supplied, immediately after the battery pack is placed, to the portable terminal device, thus enabling the portable terminal device to be immediately operated. Moreover, even when the dedicated secondary battery is out of running order or is lost, since the dedicated secondary battery does not make up a power source section proper and the battery pack is configured to be placed in the portable terminal device, the portable cellular phone can be immediately operated. Since the battery pack is provided with a voltage boosting unit (DC/DC converter), the portable terminal device can be operated by using a primary battery having a voltage being lower than that of the dedicated secondary battery. Also, since the battery pack is not connected to a multifunctional connector, other devices such as a personal computer or a like can be connected to the multifunctional connector. Furthermore, since almost no drop occurs in a voltage of the electrical double layer capacitor (power storing section) even while power consumption increases or decreases in a burst manner, capacity of the primary battery can be utilized to the fullest.

Moreover, since the primary battery produces electromotive force having a voltage being same as that of the dedicated secondary battery and the power storing section is made up of the electrical double layer capacitor having an equivalent serial resistance being lower than that of the primary battery, a current limiting circuit and DC/DC converter are not required, which can simplify its configurations. Also, since the battery pack is provided with a fuel cell, when fuel runs out, by supplementing the fuel, operations of the battery pack can be immediately restored to its normal state. Since the fuel cell generates electromotive force having a same voltage as that of the dedicated secondary battery and since the power storing section has an equivalent serial resistance being lower than the fuel cell, the current limiting circuit and DC/DC converters are not required, which can simplify its configurations. Since almost no drop occurs in a voltage of the electrical double layer capacitor (power storing section) even while power consumption increases or decreases in a burst manner, capacity of the fuel cell can be utilized to the fullest.

BRIEF DESCRIPTION OF THE DRAWINGS

The above and other objects, advantages, and features of the present invention will be more apparent from the following description taken in conjunction with the accompanying drawings in which:

FIGS. 14A, 14B, 14C, and 14D are circuit diagrams showing electrical configurations of the conventional battery pack in FIGS. 13A and 13B.

DETAILED DESCRIPTION OF THE PREFERRED EMBODIMENTS

Best modes of carrying out the present invention will be described in further detail using various embodiments with reference to the accompanying drawings.

First Embodiment

Figure 1A:
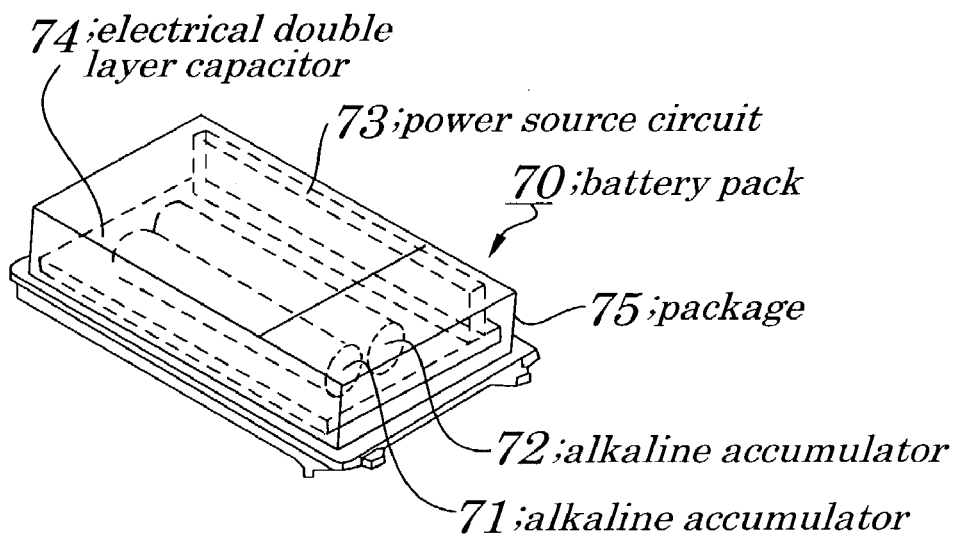
FIGS. 1A and 1B are perspective views showing a battery pack and a battery mounting section of a portable cellular phone according to a first embodiment of the present invention.
Figure 1B:
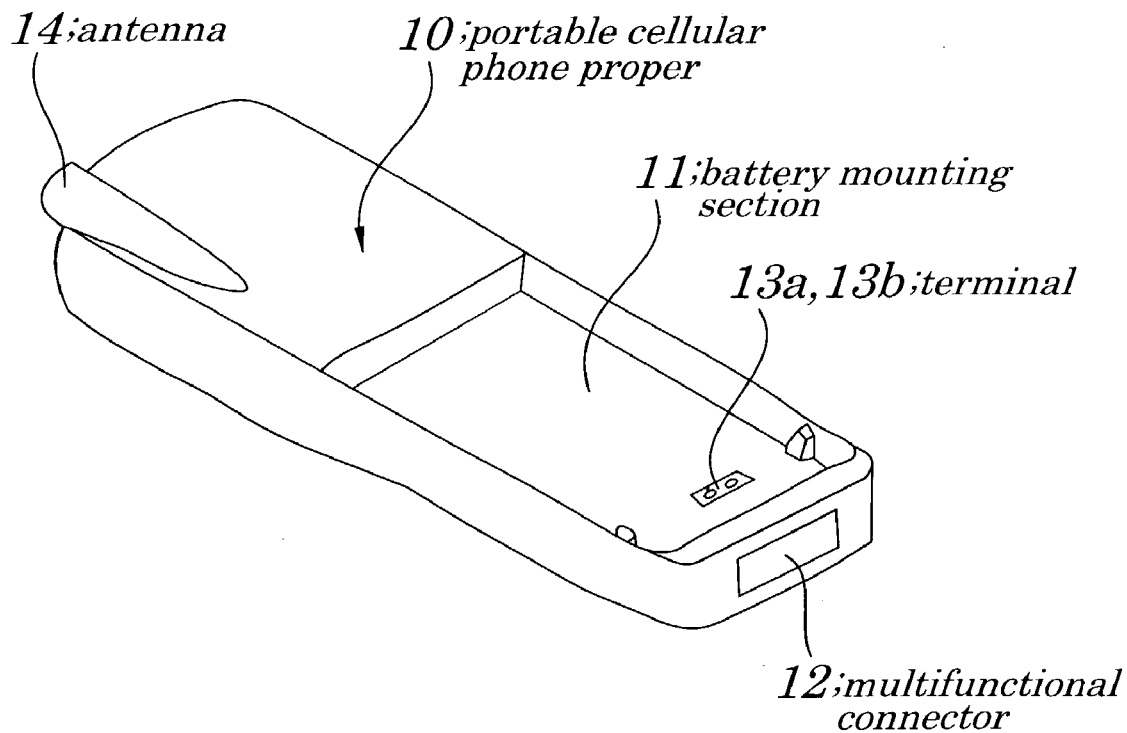
Figure 2A:
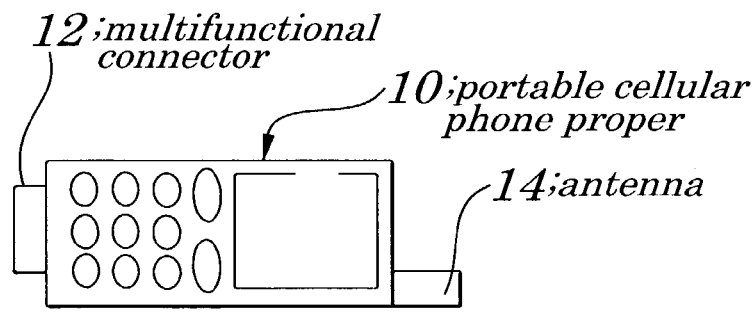
FIGS. 2A, 2B, and 2C are diagrams illustrating the portable cellular phone with its battery pack shown in FIG. 1A being placed in a portable cellular phone proper according to the first embodiment of the present invention.
Figure 2B:
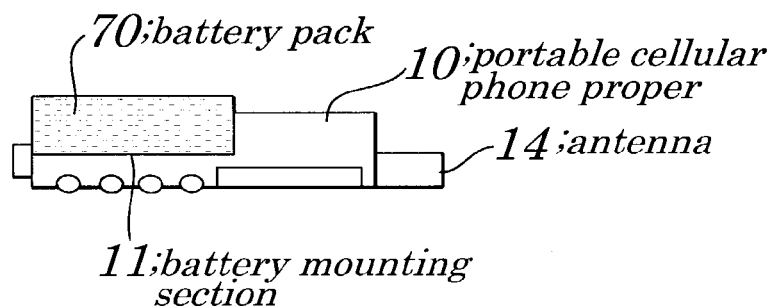
Figure 2C:
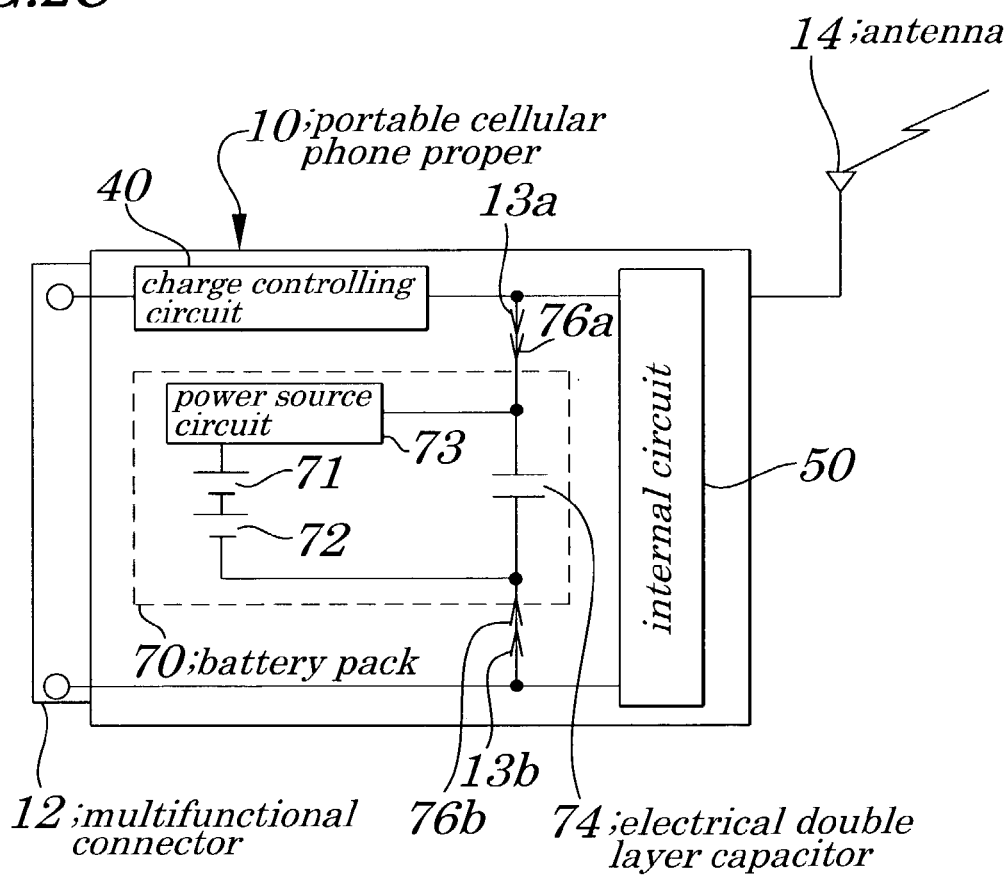
Figure 12A:
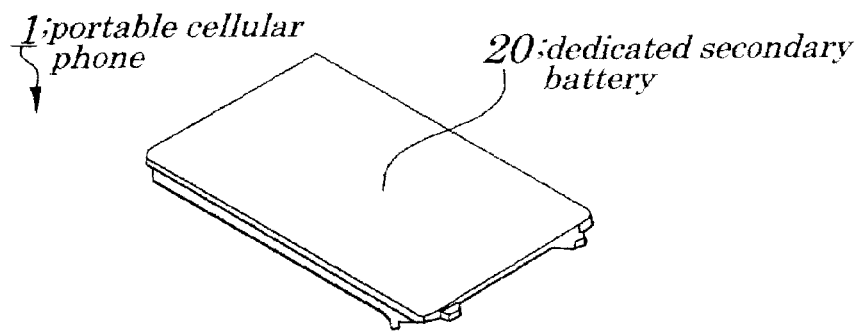
FIGS. 12A and 12B are perspective views showing a dedicated secondary battery and a battery mounting section of a conventional portable cellular phone.
Figure 13A:
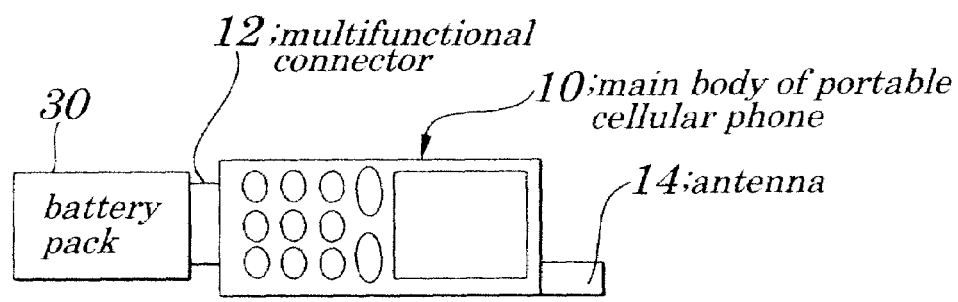
FIGS. 13A and 13B are diagrams showing the conventional portable cellular phone in which a conventional battery pack is connected to a multifunctional connector.
Figure 13B:
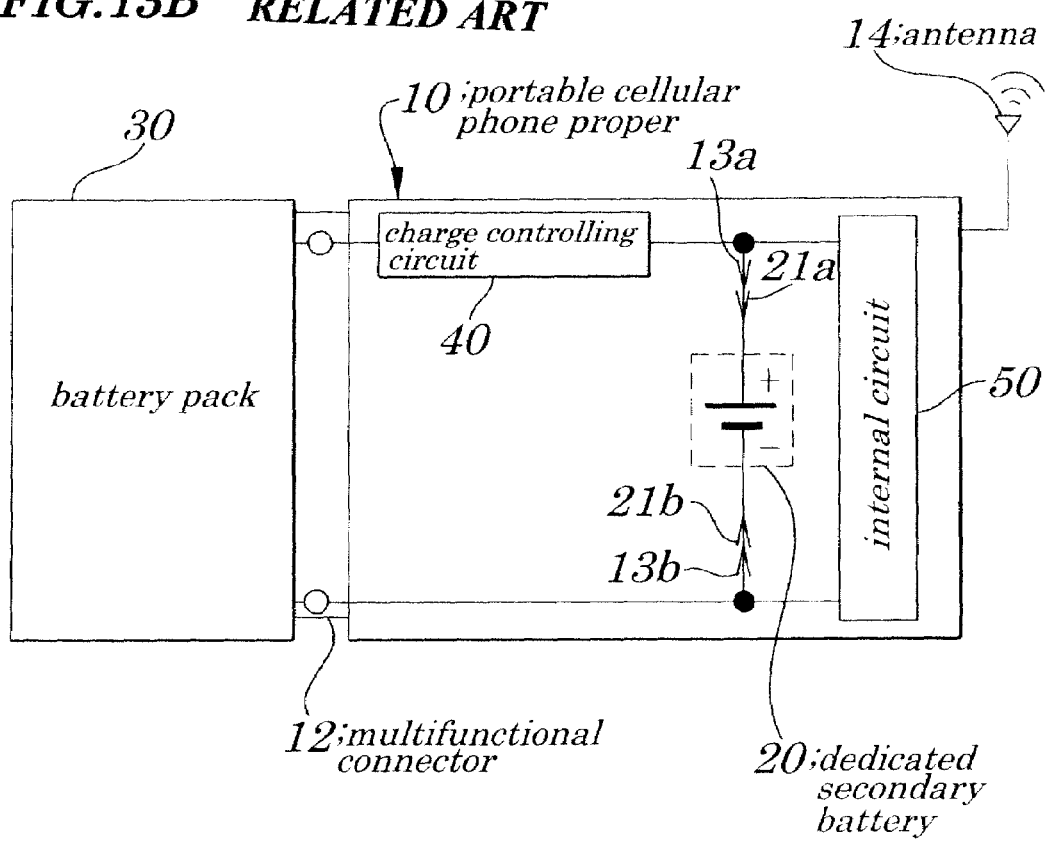

FIG. 1A is a perspective view showing a battery pack 70 and FIG. 1B is a perspective view showing a battery mounting section 11 of a portable cellular phone proper 10 according to a first embodiment of the present invention. A battery pack 70 of the first embodiment, as shown in FIG. 1A is made of alkaline accumulators 71 and 72, a power source circuit 73, an electrical double layer capacitor 74, and a package 75 to house them, and is placed in a portable cellular phone proper 10 instead of conventional detachable dedicated secondary battery 20 as shown in FIG. 12A. FIGS. 2A, 2B, and 2C are diagrams illustrating the portable cellular phone with the battery pack 70 shown in FIG. 1A being placed in the portable cellular phone proper 10 and the battery pack 70 of FIGS. 1A and 1b. FIG. 2C is a circuit diagram showing electrical configurations of the portable cellular phone of FIGS. 1A and 1B. In FIGS. 2A to 2C, same reference numbers are assigned to components having same functions as those in FIG. 1A–1B. In the portable cellular phone of the embodiment, as shown in FIG. 2A, since the conventional battery pack 30, shown in FIGS. 13A–13B, is not connected to a multifunctional connector 12, and other devices such as a personal computer or a like can be connected to the multifunctional connector 12. As shown in FIG. 2B, the battery pack 70 is mounted in the battery mounting section 11.

As shown in FIG. 2C, in the battery pack 70, the alkaline accumulators 71 and 72 are connected in series. The alkaline accumulators 71 and 72 being serially connected generate electromotive force having a voltage (3V) being lower than that of the conventional dedicated secondary battery 20. To a plus (+) side terminal of the alkaline accumulator 71 is connected an input terminal of the power source circuit 73. An electrical double layer capacitor 74 is connected between an output terminal of the power source circuit 73 and a minus (−) side terminal of the alkaline accumulator 72. The power source circuit 73 has a boosting-type DC/DC (Direct Current/Direct Current) converter which boosts a voltage of the alkaline accumulators 71 and 72 being connected in series, which is as high as that of the conventional dedicated secondary battery 20 (for example, 4.5 V) and then outputs the boosted voltage. The electrical double layer capacitor 74 is formed to be thin and planar so that it is housed in the package 75, having a capacity (for example, 10 mF or more) to feed stable power to an internal circuit 50 in a portable cellular phone in which power consumption increases or decreases in a burst manner and is charged by application of a voltage output from the power source circuit 73 and charged power is stored. Moreover, terminals 76a and 76b adapted to feed power accumulated in the electrical double layer capacitor 74 to the portable cellular phone proper 10 are connected to the electrical double layer capacitor 74.

Figure 3:
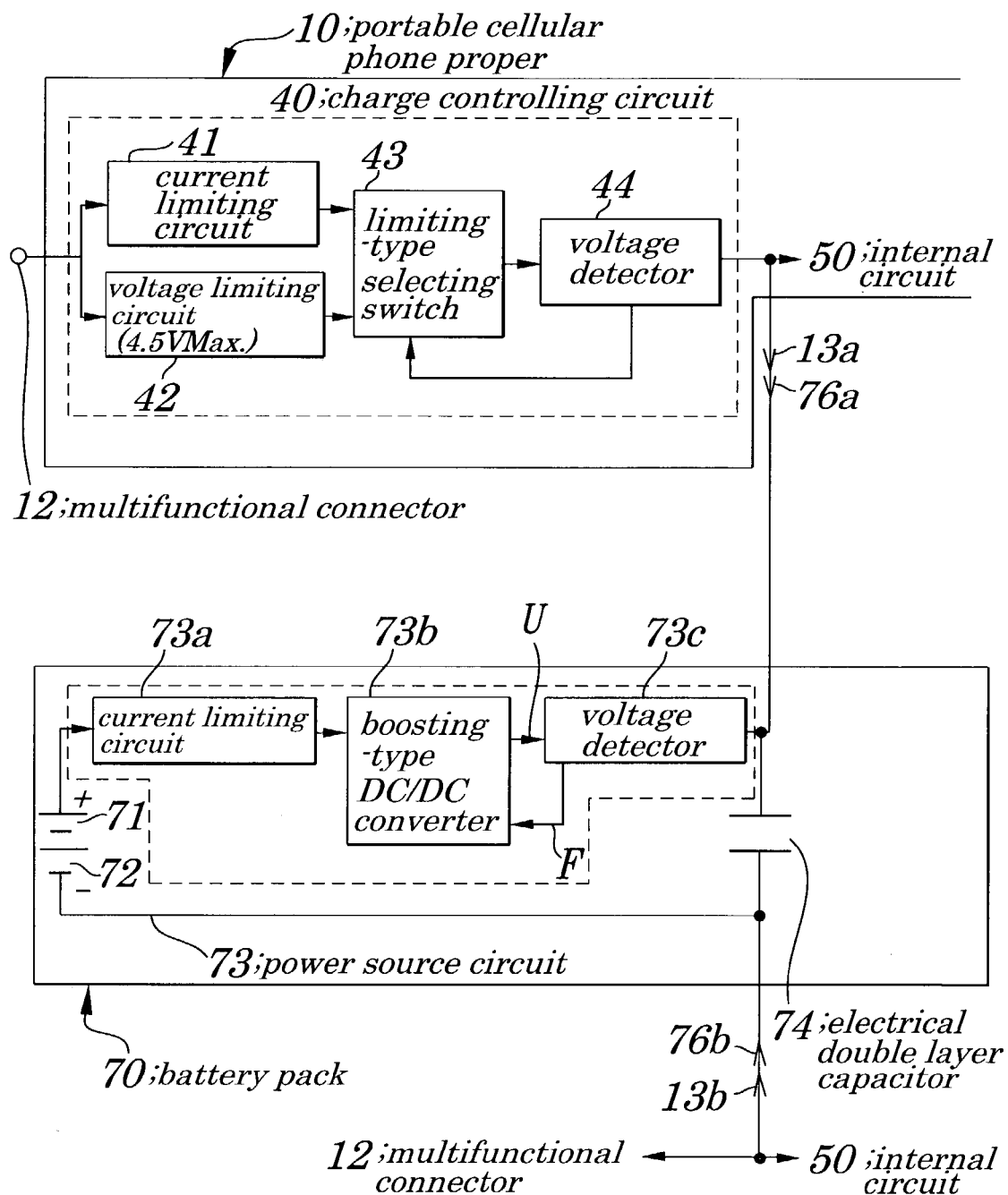
FIG. 3 is a schematic block diagram showing electrical configurations of a charge controlling circuit and a power source circuit according to the first embodiment of the present invention.
Figure 15:
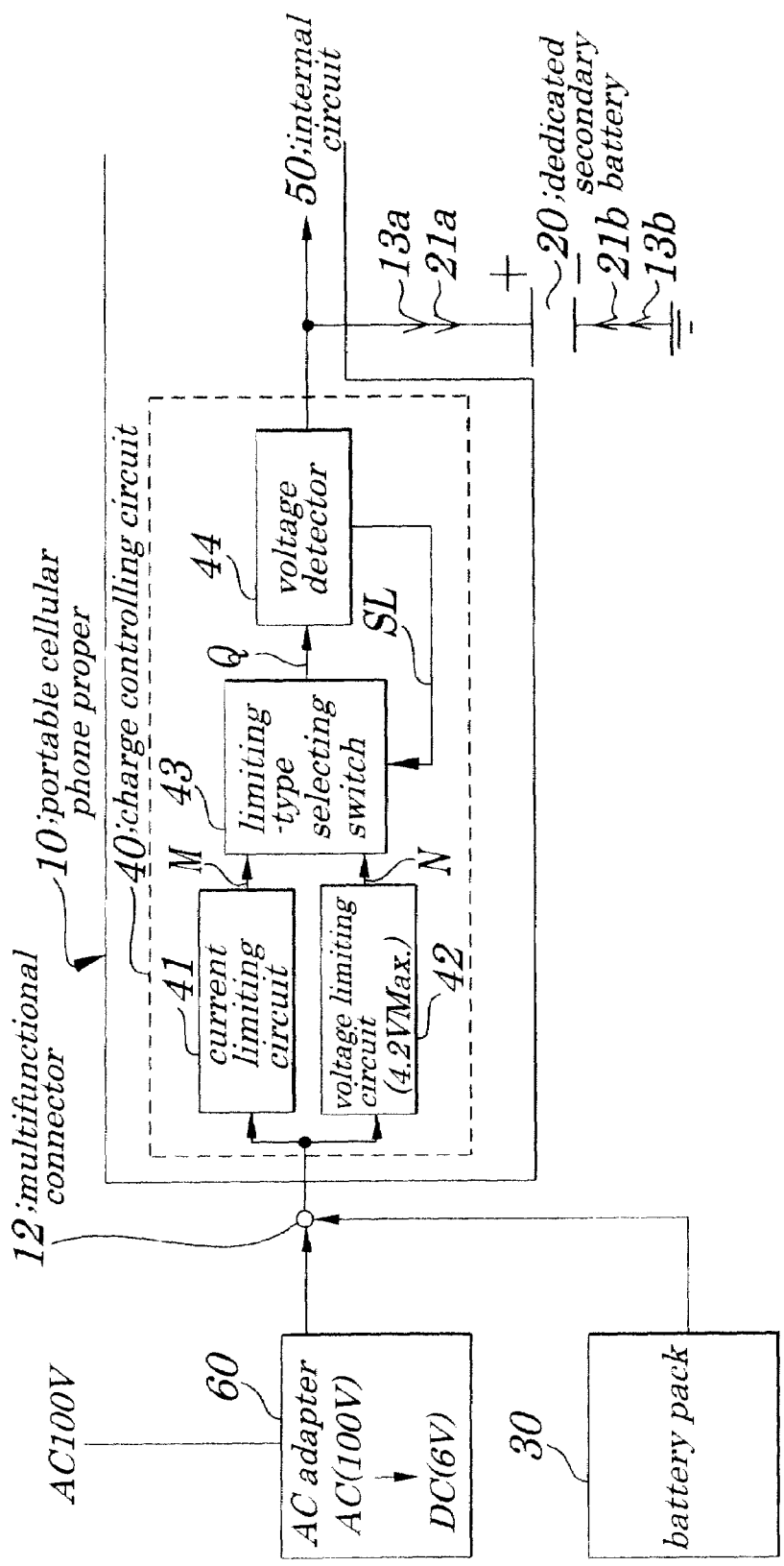
FIG. 15 is a circuit diagram showing conventional electrical configurations of a charge controlling circuit 40 shown in FIGS. 13A and 13B.

FIG. 3 is a schematic block diagram showing electrical configurations of a charge controlling circuit 40 and the power source circuit 73 in FIG. 2C according to the first embodiment of the present invention. In FIG. 3, same reference numbers are assigned to components having same functions as those shown in FIG. 15. The power source circuit 73, as shown in FIG. 3, includes a current limiting circuit 73a, a boosting-type DC/DC converter 73b and a voltage detector 73c. The current limiting circuit 73a limits a current flow of input electromotive force of the alkaline accumulators 71 and 72 to a level being a predetermined value or less and outputs the limited current. The above limited current value is so set that a life of the alkaline accumulators 71 and 72 is lengthened as much as possible by discharging the electrical double layer capacitor 74 preferentially rather than the alkaline accumulators 71 and 72 while power consumption increases or decreases in a burst manner. The boosting-type DC/DC converter 73b boosts a voltage of electromotive force of the alkaline accumulators 71 and 72 fed from the current limiting circuit 73a to an output voltage being equal to that of the conventional dedicated secondary battery 20. The voltage detector 73c detects a voltage U output from the boosting-type DC/DC converter 73b and feeds the detected voltage to the electrical double layer capacitor 74, produces a negative feedback signal F, and transmits the produced negative feedback signal F used to exert negative-feedback controlling on the output voltage U to the boosting-type DC/DC converter 73b.

Figure 4:
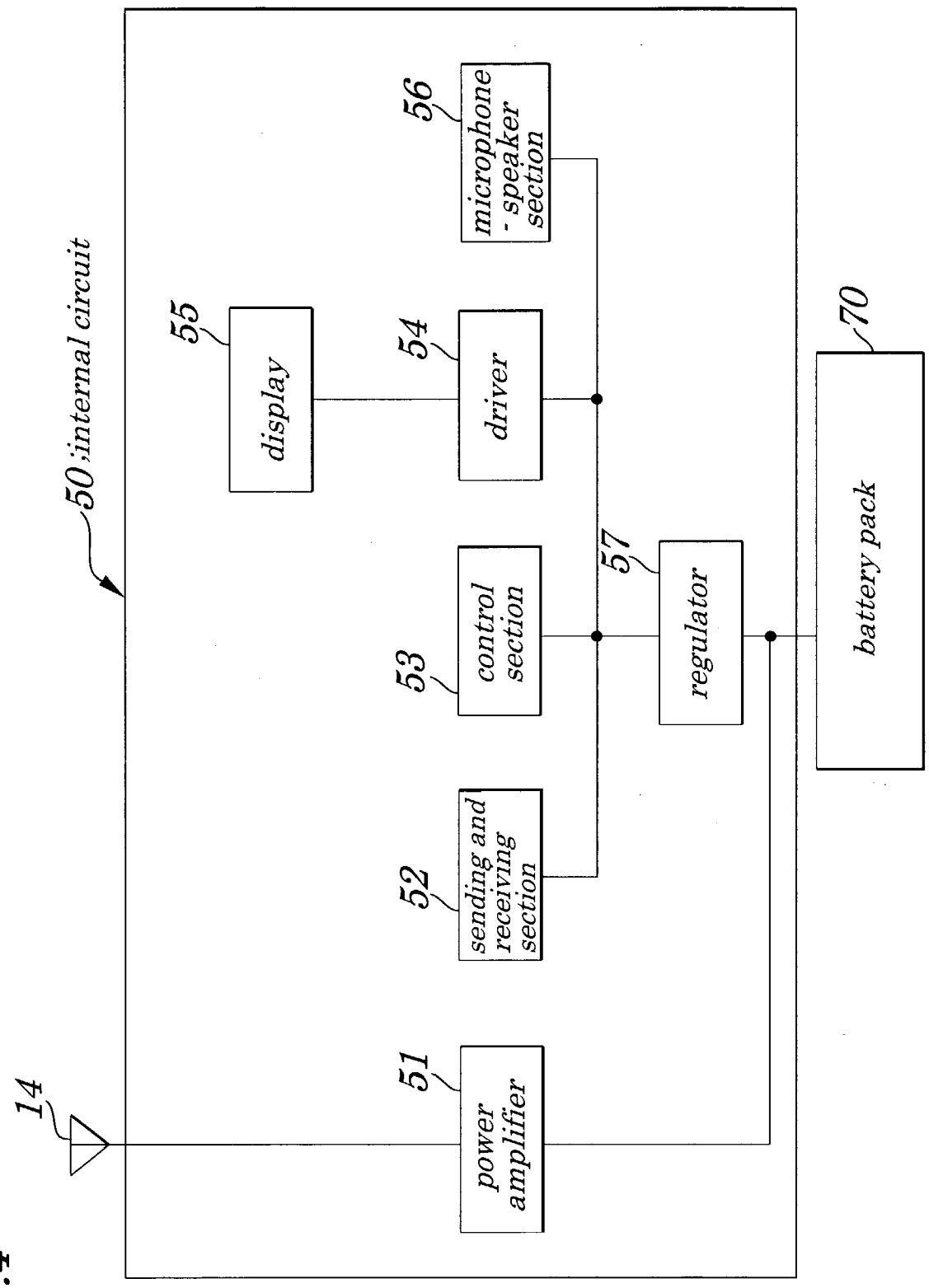
FIG. 4 is a schematic block diagram showing electrical configurations of an internal circuit shown in FIG. 2C.

FIG. 4 is a schematic block diagram showing electrical configurations of the internal circuit 50 shown in FIG. 2C. The internal circuit 50, as shown in FIG. 4, includes a power amplifier 51, a sending and receiving section 52, a control section 53, a driver 54, a display 55, a microphone—speaker section 56, and a regulator 57. The power amplifier 51 receives a voltage output from the battery pack 70 and transmits a sending signal output from the sending and receiving section 52 through an antenna 14 as a transmitting radio wave to be handled according to a TDMA (Time Division Multiple Access) communication method. To perform the TDMA communication method, specifications called a PDC (Personal Digital Cellular) system are employed in Japan and specifications called a GSM (Global System for Mobile Communication) system are employed in Europe. The sending and receiving section 52 transmits and receives a radio signal through the antenna 14.

The control section 53 is made up of a CPU (Central Processing Unit) or a like (not shown) and controls entire operations of the internal circuit 50 based on a control program. The driver 54 converts a voice signal fed from the microphone-speaker section 56 into a digital signal, converts a digital signal fed from the sending and receiving section 52 into a voice signal, and sends out the converted signal to the microphone-speaker section 56. Moreover, the driver 54 sends out a signal for displaying to the display 55. The display 55 displays information such as various messages to a user. The regulator 57 receives a voltage output from the battery pack 70, produces a constant voltage having a predetermined value and feeds the produced voltage to the sending and receiving section 52, control section 53, driver 54, and microphone-speaker section 56.

Figure 12B:
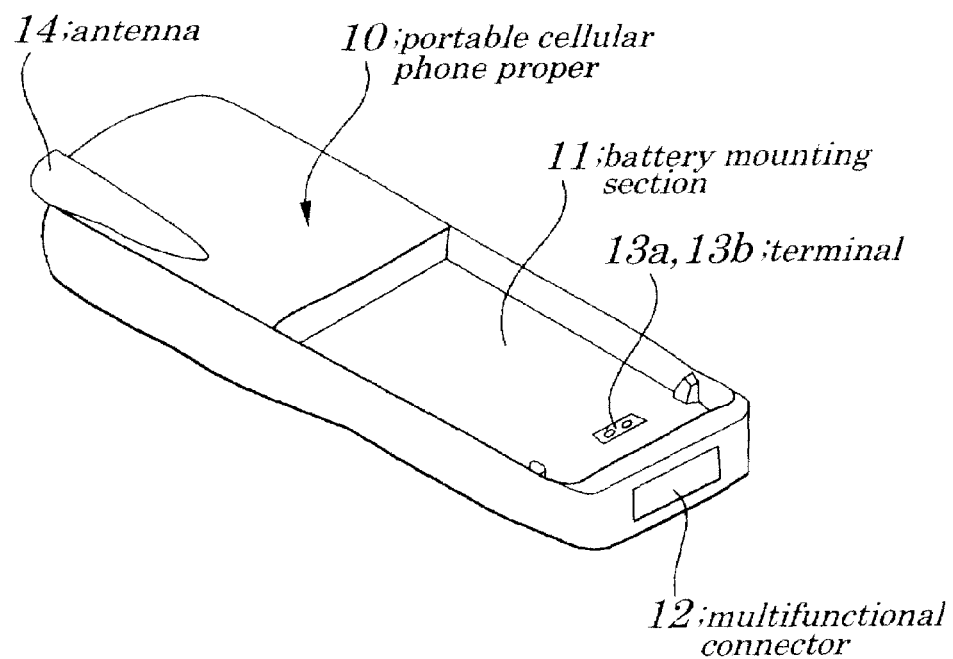

Next, operations of the battery pack 70 of the first embodiment are described. As shown in FIGS. 12A and 12B, a portable cellular phone 1 operates using the dedicated secondary battery 20 as a power source and, if the dedicated secondary battery 20 is discharged, instead of the dedicated secondary battery 20, the battery pack 70 is used to supply power according to the present invention. That is, in the battery pack 70, electromotive force having a voltage of 3V is generated by alkaline accumulators 71 and 72 being connected in series. In the battery pack 70, a current flow of the electromotive force produced by the alkaline accumulators 71 and 72 is limited by the current limiting circuit 73a to a level being not more than a predetermined value and is sent out to the boosting-type DC/DC converter 73b where a voltage of the electromotive force is boosted to the output voltage U being equal to such the voltage employed in the conventional dedicated secondary battery 20. The output voltage U is detected by the voltage detector 73c and is negative-feedback controlled so as to be a predetermined value by transmission of the negative feedback signal F from the voltage detector 73c to the boosting-type DC/DC converter 73b. Moreover, the output voltage U of the boosting-type DC/DC converter 73b is applied to the electrical double layer capacitor 74. Then, power is stored in the electrical double layer capacitor 74. The power is fed through terminals 76a and 76b (FIG. 3) from terminals 13a and 13b (FIG. 3) to the portable cellular phone proper 10. In the portable cellular phone proper 10, a transmitting radio wave is transmitted according to the TDMA communication method and, at this point, a pulse-like load current having a frequency determined according to the TDMA communication method is taken out from the battery pack 70. Since the electrical double layer capacitor 74 has capacitance enough to feed stable power to the internal circuit 50 in which power consumption increases or decreases in a burst manner, almost no drop in a voltage of the electrical double layer capacitor 74 occurs even while power consumption of the power amplifier 51 increases or decreases in a burst manner. Therefore, since a message that a voltage of the battery pack 70 has reached a final voltage even in a state in which a discharging depth of the alkaline accumulators 71 and 72 is shallow does not appear on the display 55 of the portable cellular phone proper 10, capacity of the alkaline accumulators 71 and 72 can be utilized to the fullest.

Thus, according to configurations of the first embodiment, since the battery pack 70 is placed in the portable cellular phone proper 10 instead of the dedicated secondary battery 20, power being accumulated in the electrical double layer capacitor 74 is fed to the portable cellular phone immediately after the battery pack 70 is installed, thereby enabling the portable cellular phone to be operated immediately. Moreover, even when the dedicated secondary battery 20 is out of running order or is lost, the portable cellular phone can be operated immediately, since the dedicated secondary battery 20 does not make up a power source section proper and the battery pack 70 is mounted in the battery mounting section 11 instead. Also, the battery pack 70, since it is provided with the boosting-type DC/DC converter 73*b*, can operate the portable cellular phone by serially-connected and light-weight two pieces of alkaline accumulators 71 and 72 or one piece of alkaline accumulator. Furthermore, since the battery pack 70 is connected to terminals 13*a* and 13*b* and is not connected to the multifunctional connector 12, the multifunctional connector 12 can be connected to other devices such as a personal computer or a like. Also, since a voltage of the electrical double layer capacitor 74 does not drop even when the power consumption increases or decreases in a burst manner, capacity of the alkaline accumulators 71 and 72 can be utilized to the fullest. Also, since the user of the portable cellular phone can easily obtain such alkaline accumulators regardless of where or when the user lives or stays, when the alkaline accumulators 71 and 72 are discharged, the user can replace the discharged alkaline accumulators 71 and 72 with new ones.

Second Embodiment

Figure 5A:
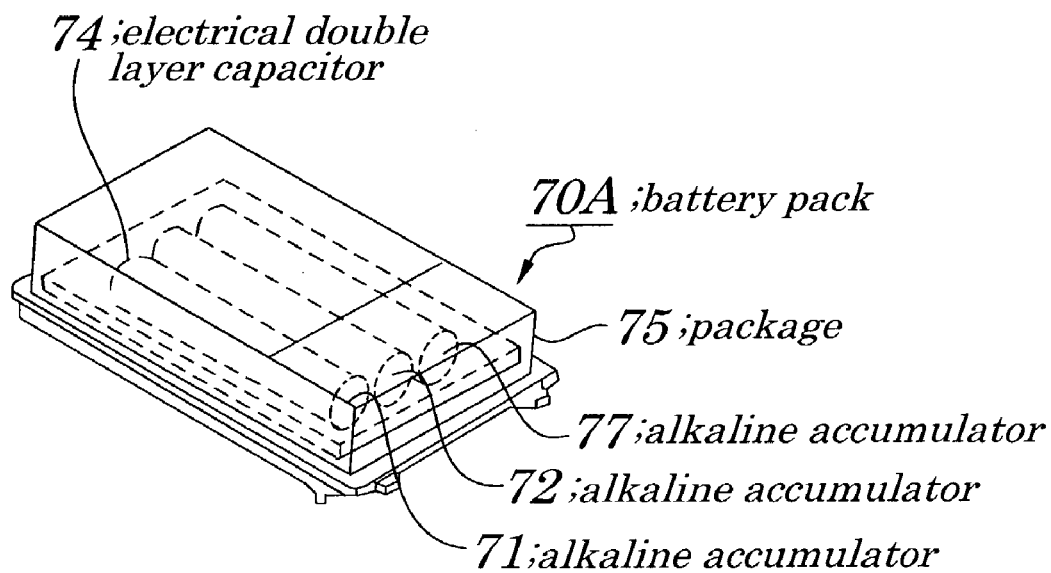
FIGS. 5A and 5B are perspective views showing a battery pack and a battery mounting section of a portable cellular phone according to a second embodiment of the present invention.
Figure 5B:
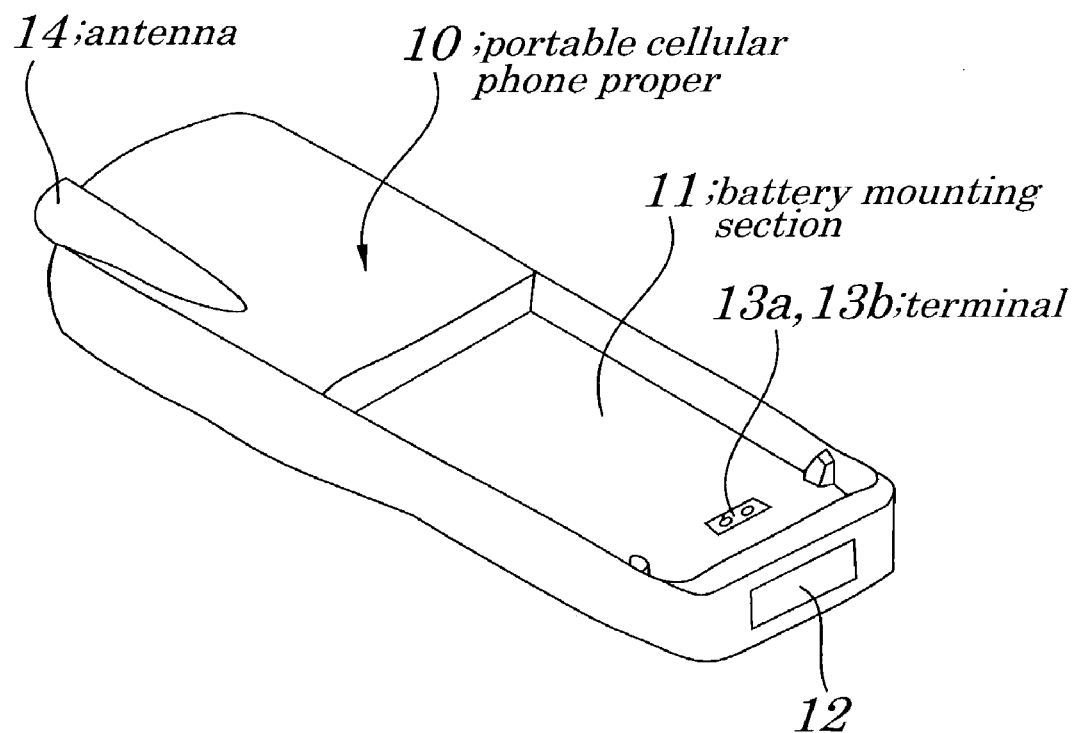

FIGS. 5A and 5B are perspective views showing a battery pack 70A and a battery mounting section 11 of a portable cellular phone proper 10 according to a second embodiment of the present invention. In FIGS. 5A and 5B, same reference numbers are assigned to components having same functions as those in FIGS. 1A and 1B. In the battery pack 70A of the second embodiment, as shown in FIG. 5A, a power source circuit 73 is removed from the battery pack 70A and an alkaline accumulator 77 is additionally provided. Other components are same as those in FIGS. 1A and 1B and their description is omitted for brevity.

Figure 6A:
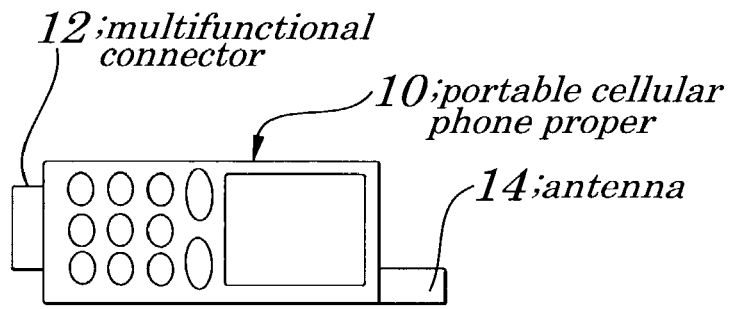
FIGS. 6A, 6B and 6C are diagrams illustrating the portable cellular phone with its battery pack shown in FIG. 5A placed in a portable cellular phone proper according to the second embodiment of the present invention.
Figure 6B:
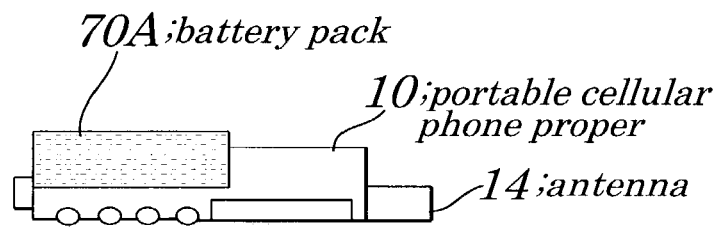
Figure 6C:
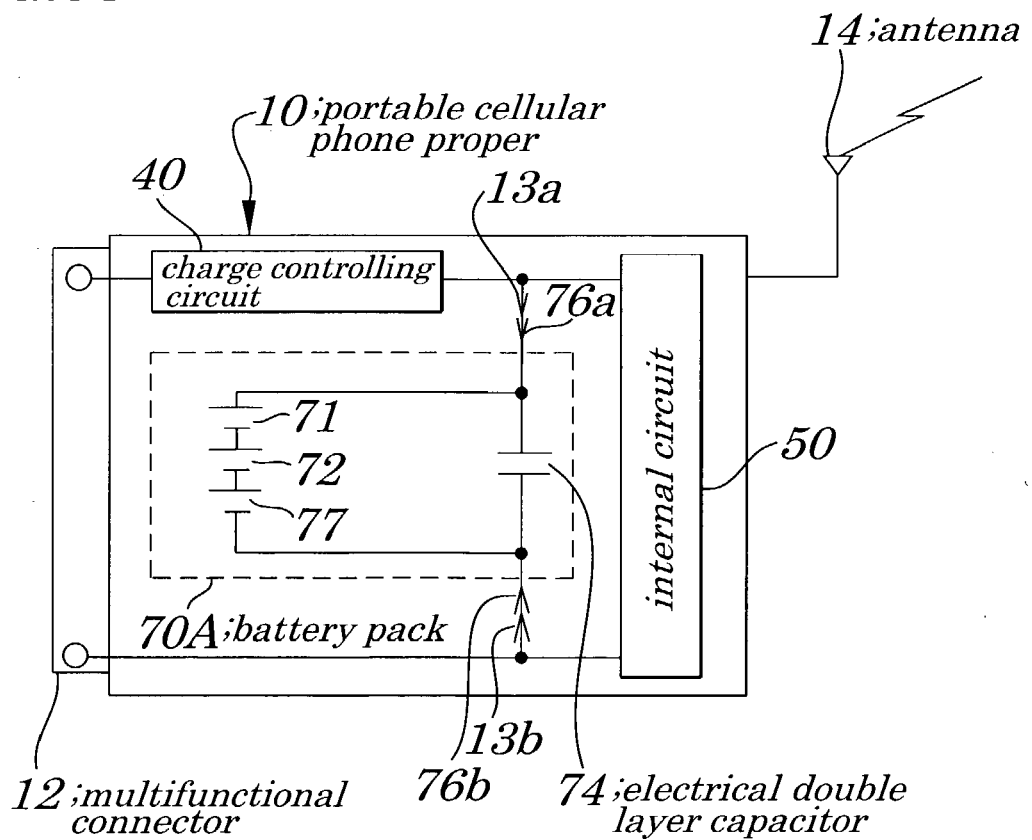

FIGS. 6A, 6B and 6C are diagrams illustrating a portable cellular phone in which its battery pack 70A shown in FIG. 5A is placed in a portable cellular phone proper 10 (FIG. 5B) of the second embodiment of the present invention. In FIGS. 6A, 6B, and 6C, same reference numbers are assigned to components having same functions as those in FIGS. 2A, 2B, and 2C. As shown in FIG. 6C, in the battery pack 70A, alkaline accumulators 71, 72, and 77 are connected in series. The serially connected alkaline accumulators 71, 72, and 77 generate electromotive force having a voltage of 4.5 V, which is same as that generated by a dedicated secondary battery 20 provided in the conventional example. To the serially connected alkaline accumulators 71, 72, and 77 is connected an electrical double layer capacitor 74 in parallel. In the second embodiment, the electrical double layer capacitor 74 whose equivalent serial resistance is lower than that of the serially connected alkaline accumulators 71, 72, and 77 is used. The equivalent serial resistance is so set that a life of each of the alkaline accumulators 71, 72, and 77 is lengthened as much as possible by discharging the electrical double layer capacitor 74 preferentially rather than each of the alkaline accumulators 71, 72, and 77 while power consumption increases or decreases in a burst manner.

Next, operations of the battery pack 70A of the second embodiment are described. The conventional portable cellular phone 1 operates using the dedicated secondary battery 20 shown in FIG. 12A as a power source. However, in the embodiment, at this point, if the dedicated secondary battery 20 of the portable cellular phone 1 is discharged, the battery pack 70A instead of the dedicated secondary battery 20 is used to supply power. That is, in the battery pack 70A, electromotive force of 4.5V is generated by the serially connected alkaline accumulators 71, 72, and 77. A voltage produced by the alkaline accumulators 71, 72, and 77 is applied to an electrical double layer capacitor 74. Then, the produced power is stored in the electrical double layer capacitor 74. The produced power is supplied through terminals 76*a* and 76*b* from terminals 13*a* and 13*b* to the portable cellular phone proper 10. In the portable cellular phone proper 10, same operations as in the first embodiment are performed. In this case, since the equivalent serial resistance of the electrical double layer capacitor 74 is lower than that of the serially connected alkaline accumulators 71, 72, and 77, the electrical double layer capacitor 74 is preferentially discharged while power consumption increases or decreases in a burst manner. Since almost no drop in voltage of the electrical double layer capacitor 74 occurs even while power consumption increases or decreases in a burst manner, a message that a voltage of the battery pack 70A has reached a final voltage even in a state in which a discharging depth of the alkaline accumulators 71, 72, and 77 is shallow does not appear on display section of the portable cellular phone proper 10, capacity of the alkaline accumulators 71, 72, and 77 can be utilized to the fullest.

Thus, according to configurations of the second embodiment, since the battery pack 70A is placed in the portable cellular phone proper 10 instead of the dedicated secondary battery 20, power being accumulated in the electrical double layer capacitor 74 is fed to the portable cellular phone proper immediately after the battery pack 70A is installed, thereby enabling the portable cellular phone to be operated immediately. Since the battery pack 70A is mounted in the portable cellular phone proper 10 and since the dedicated secondary battery 20 is not mounted in a power source section, the portable cellular phone can be operated immediately even if the dedicated secondary battery 20 is out of running order or is lost. Moreover, in the battery pack 70A, since the alkaline accumulators 71, 72, and 77 produce electromotive force having same voltage (for example, 4.5 V) as that of the dedicated secondary battery 20 and since the equivalent serial resistance of the electrical double layer capacitor 74 is lower than that of the alkaline accumulators 71, 72, and 77, mounting of a power source circuit 73 (as in the first embodiment) is not required and its configurations can be more simplified. Moreover, since the battery pack 70A is connected to terminals 13*a* and 13*b* and is not connected to a multifunctional connector 12, the multifunctional connector 12 can be connected to other devices such as a personal computer or a like. Also, since a voltage of the electrical double layer capacitor 74 does not drop even when the power consumption increases or decreases in a burst manner, capacity of the alkaline accumulators 71, 72, and 77 can be utilized to the fullest.

Third Embodiment

Figure 7A:
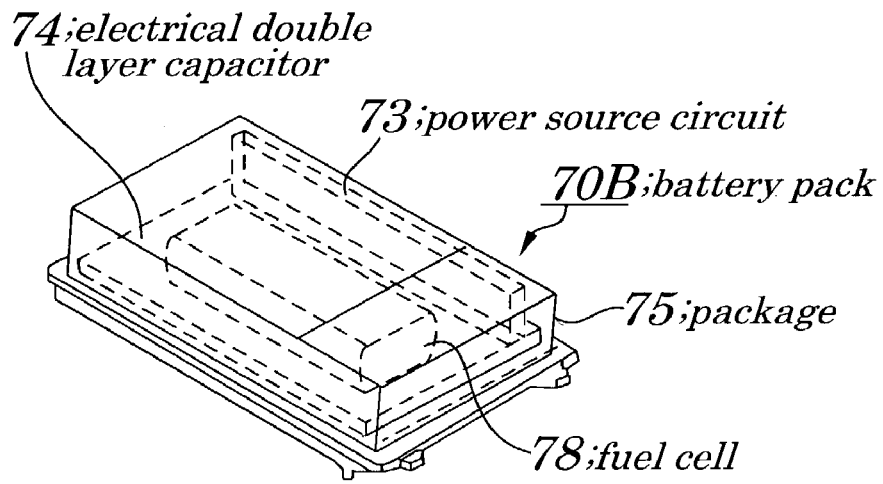
FIGS. 7A and 7B are perspective views showing a battery pack and a battery mounting section of a portable cellular phone according to a third embodiment of the present invention.
Figure 7B:
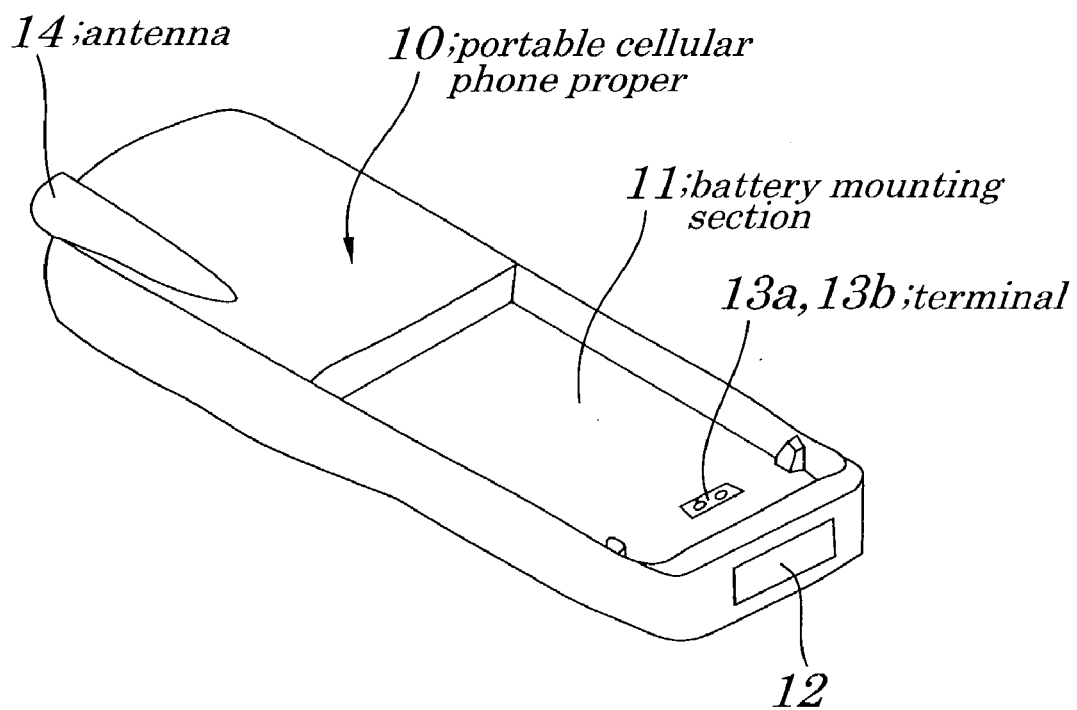

FIGS. 7A and 7B are perspective views showing a battery pack 70B and a battery mounting section 11 of a portable cellular phone proper 10 according to a third embodiment of the present invention. In FIGS. 7A and 7B, same reference numbers are assigned to components having same functions as those in FIGS. 1A and 1B and description of some parts have been omitted. In the battery pack 70B of the third embodiment, as shown in FIGS. 7A and 7B, instead of alkaline accumulators 71 and 72 shown in FIGS. 1A and 1B, a fuel cell 78 is provided. Other configurations are same as those in FIGS. 1A and 1B.

Figure 8A:
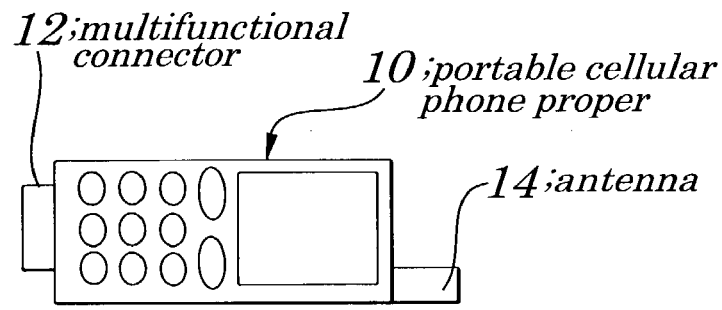
FIGS. 8A, 8B, and 8C are diagrams illustrating the portable cellular phone in which its battery pack shown in FIG. 7A is placed in a portable cellular phone proper according to the third embodiment of the present invention.
Figure 8B:
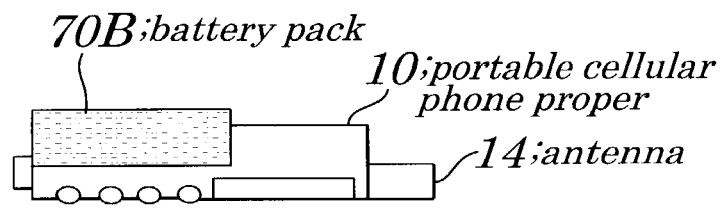
Figure 8C:
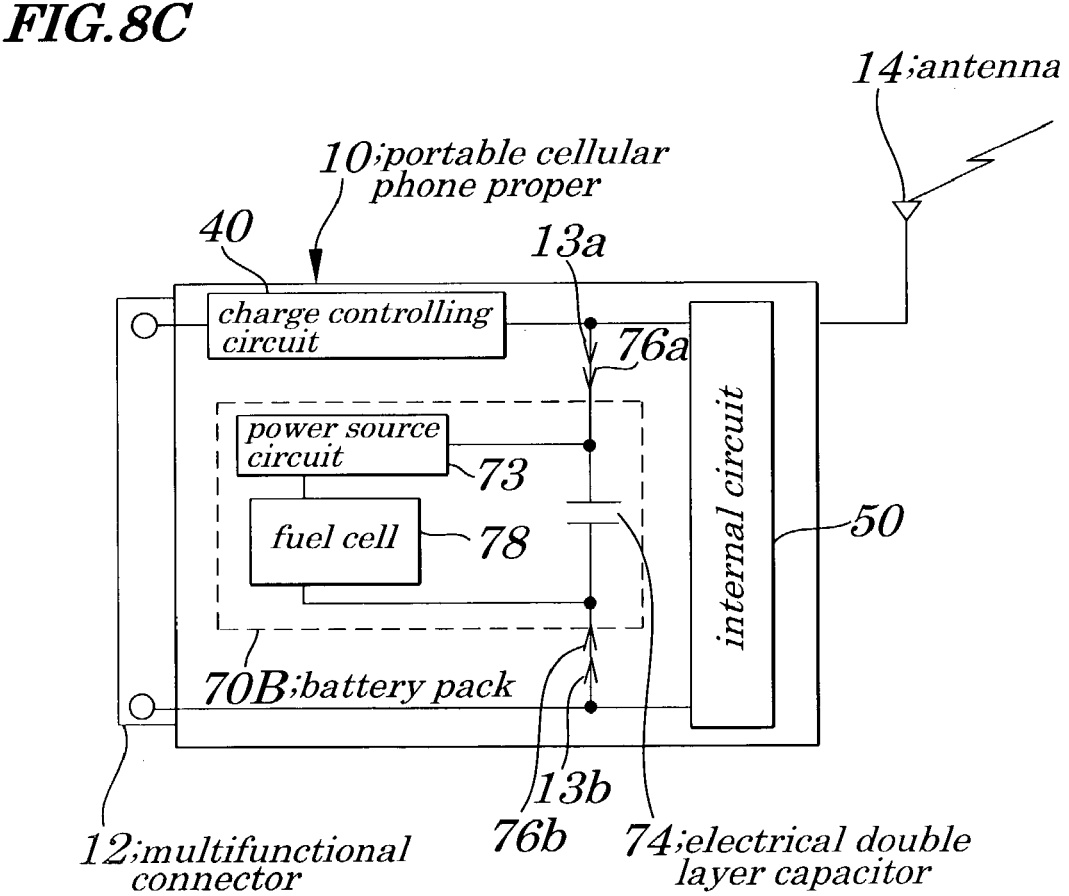

FIGS. 8A, 8B, and 8C are diagrams illustrating a portable cellular phone in which its battery pack 70B shown in FIG. 7A is placed in the portable cellular phone proper 10 of the first embodiment of the present invention. In FIGS. 8A, 8B, and 8C, same reference numbers are assigned to components having same functions as those in FIG. 2. As shown in FIG. 8C, in the battery pack 70B, the fuel cell 78 is provided instead of the serially connected alkaline accumulators 71 and 72. The fuel cell 78 produces electromotive force having a voltage (for example, 3V) being lower than that of the dedicated secondary battery 20 (conventional art). Other configurations are same as those in FIG. 2.

Figure 9:
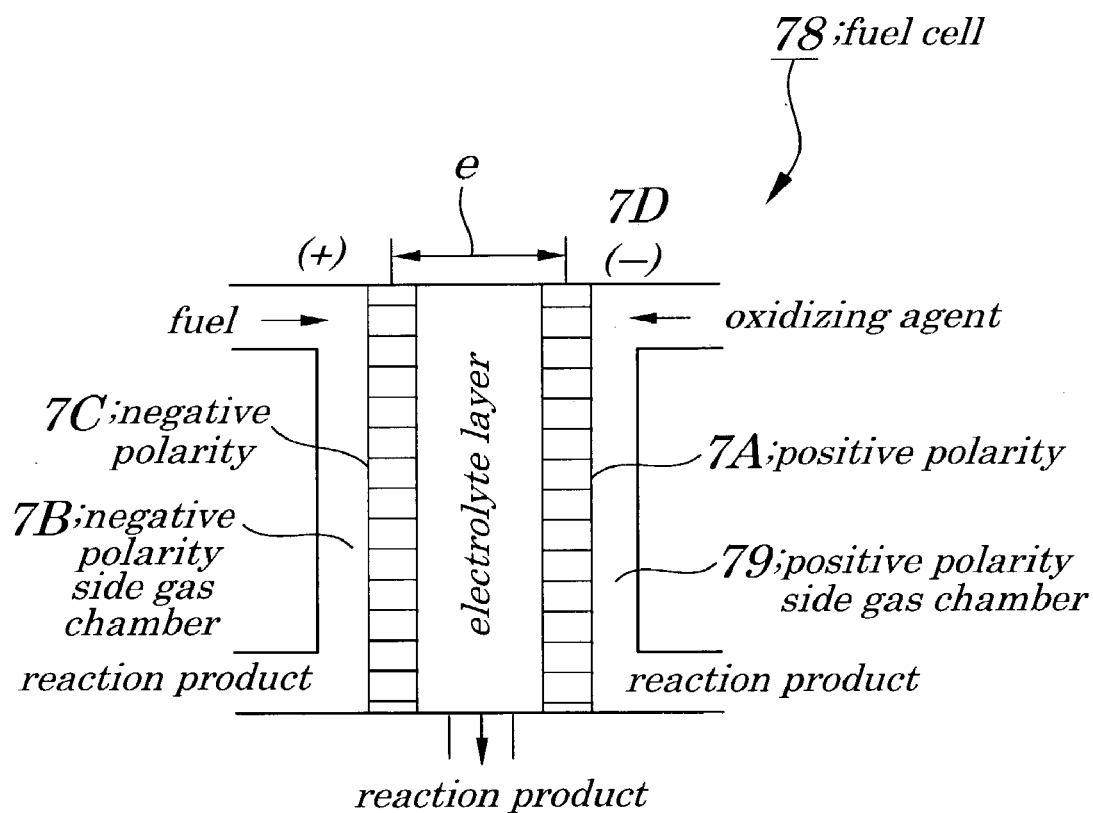
FIG. 9 is a configuration diagram showing one example of a fuel cell in FIG. 8C.

FIG. 9 is a configuration diagram showing one example of the fuel cell 78 in FIG. 8C. The fuel cell 78, as shown in FIG. 9, includes a positive polarity side gas chamber 79, a positive polarity 7A, a negative polarity side gas chamber 7B, a negative polarity 7C, an electrolyte layer 7D placed between the positive polarity 7A and the negative polarity 7C. In the fuel cell 78, a positive polarity active material (oxidizing agent) is taken in the positive polarity side gas chamber 79 and a given negative active material (fuel made of hydrogen, methanol, or a like) is taken in the negative polarity side gas chamber 7B and a reaction product is output from the positive polarity active material 79, the negative polarity side gas chamber 7B, and the electrolyte layer 7D and, at a same time, electromotive force "e" is produced between the positive polarity 7A and the negative polarity 7C.

Next, operations of the battery cell of the third embodiment are described. A portable cellular phone 1 shown in FIGS. 12A and 12B is operated using a dedicated secondary battery 20 as a power source in the conventional art. However, in the embodiment, if the dedicated secondary battery 20 in the portable cellular phone 1 is discharged, instead of the dedicated secondary battery 20, the battery pack 70B is used to supply power. That is, in the battery pack 70B of the embodiment, electromotive force having a voltage of 3V is generated by the fuel cell 78. A current flow of the electromotive force is limited by a current limiting circuit 73a to a level being not more than a predetermined value and is sent out to a boosting-type DC/DC converter 73b and then is boosted by the boosting-type DC/DC converter 73b to an output voltage "U" (FIG. 3) being same as that of the dedicated secondary battery 20. The output voltage U is detected by a voltage detector 73c and is negative-feedback controlled so as to be a predetermined value by transmission of a negative feedback signal F from the voltage detector 73c to the boosting-type DC/DC converter 73b. The output voltage U from the boosting-type DC/DC converter 73b is applied to a electrical double layer capacitor 74 (FIG. 7A). The applied power is stored in the electrical double layer capacitor 74. The power is fed through terminals 76a and 76b from terminals 13a and 13b to the portable cellular phone proper 10. In the portable cellular phone proper 10, same operations as those in the first embodiment are performed are performed. In this case, since the electrical double layer capacitor 74 has a capacitor to feed stable power to an internal circuit 50 in which power consumption increases or decreases in a burst manner, almost no drop in a voltage of the electrical double layer capacitor 74 occurs even while power consumption of a power amplifier 51 increases or decreases in a burst manner. Therefore, since a message that a voltage of the battery pack 70B has reached a final level even in a state in which a discharging depth of the fuel cell 78 is shallow does not appear on a display section of the portable cellular phone proper 10, capacity of the fuel cell 78 can be utilized to the fullest.

Thus, in the third embodiment, almost same advantages as obtained in the first embodiment can be also achieved. Additionally, since the battery pack 70B is provided with the fuel cell 78 instead of the alkaline accumulators 71 and 72 shown in FIGS. 1A and 1B, when fuel runs out, by supplementing the fuel, operations of the battery pack 70B are immediately restored to its normal state. Moreover, since no drop in voltage of the electrical double layer capacitor 74 occurs even while power consumption increases or decreases in a burst manner, capacity of the fuel cell 78 can be utilized to the fullest.

Fourth Embodiment

Figure 10A:
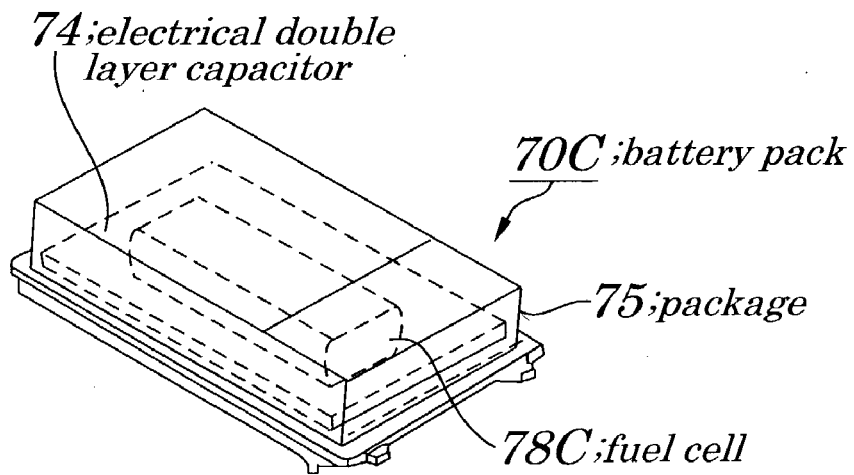
FIGS. 10A and 10B are perspective views showing a battery pack and a battery mounting section of a portable cellular phone according to a fourth embodiment of the present invention.
Figure 10B:
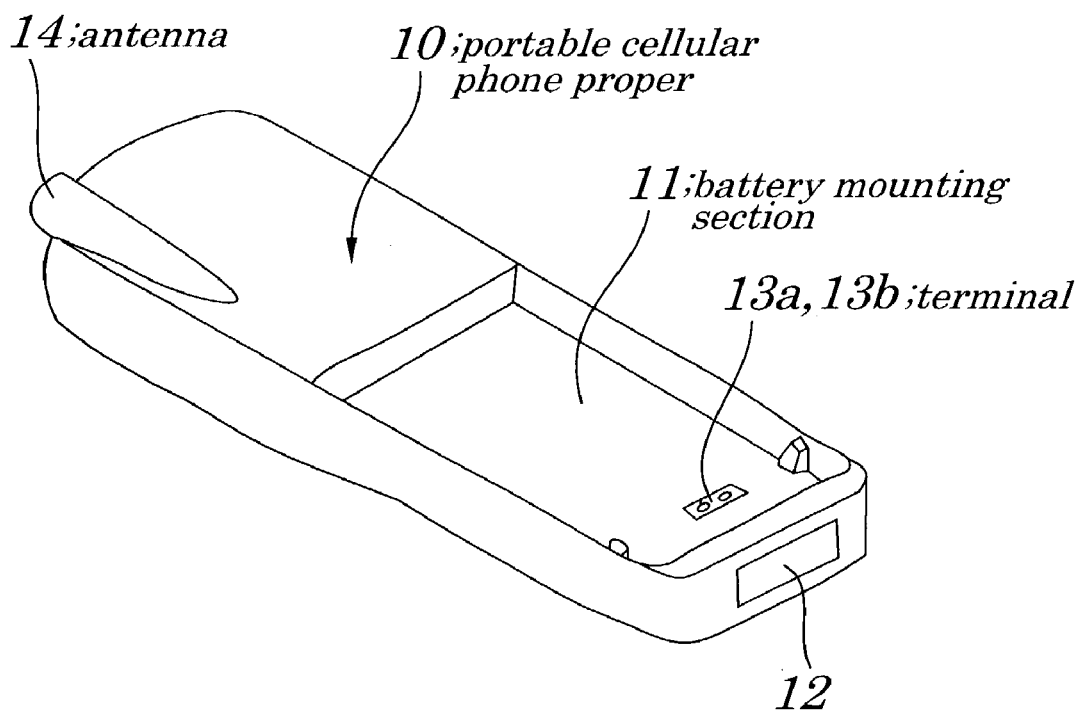

FIGS. 10A and 10B are perspective views showing a battery pack 70C and a battery mounting section 11 of a portable cellular phone proper 10 according to a fourth embodiment of the present invention. In FIGS. 10A and 10B, same reference numbers are assigned to components having same functions as those in FIGS. 7A and 7B. In the battery pack 70C, as shown in FIG. 10A, a power source circuit 73 provided in a battery pack 70B shown in FIG. 7A is removed and, instead of a fuel cell 78, a fuel cell 78C is provided. Other configurations are same as those in FIGS. 7A and 7B and description has been omitted.

Figure 11A:
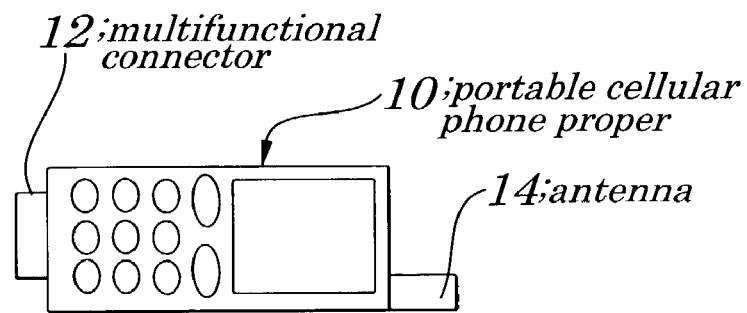
FIGS. 11A, 11B, and 11C are diagrams illustrating the portable cellular phone in which its battery pack shown in FIG. 10A is placed in a portable cellular phone proper according to the fourth embodiment of the present invention.
Figure 11B:
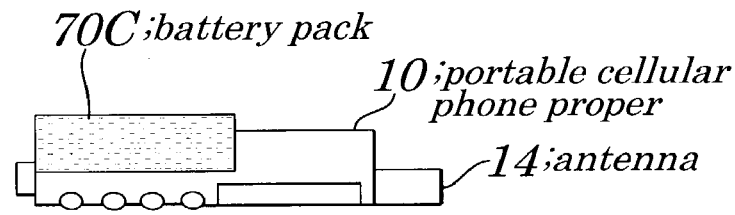
Figure 11C:
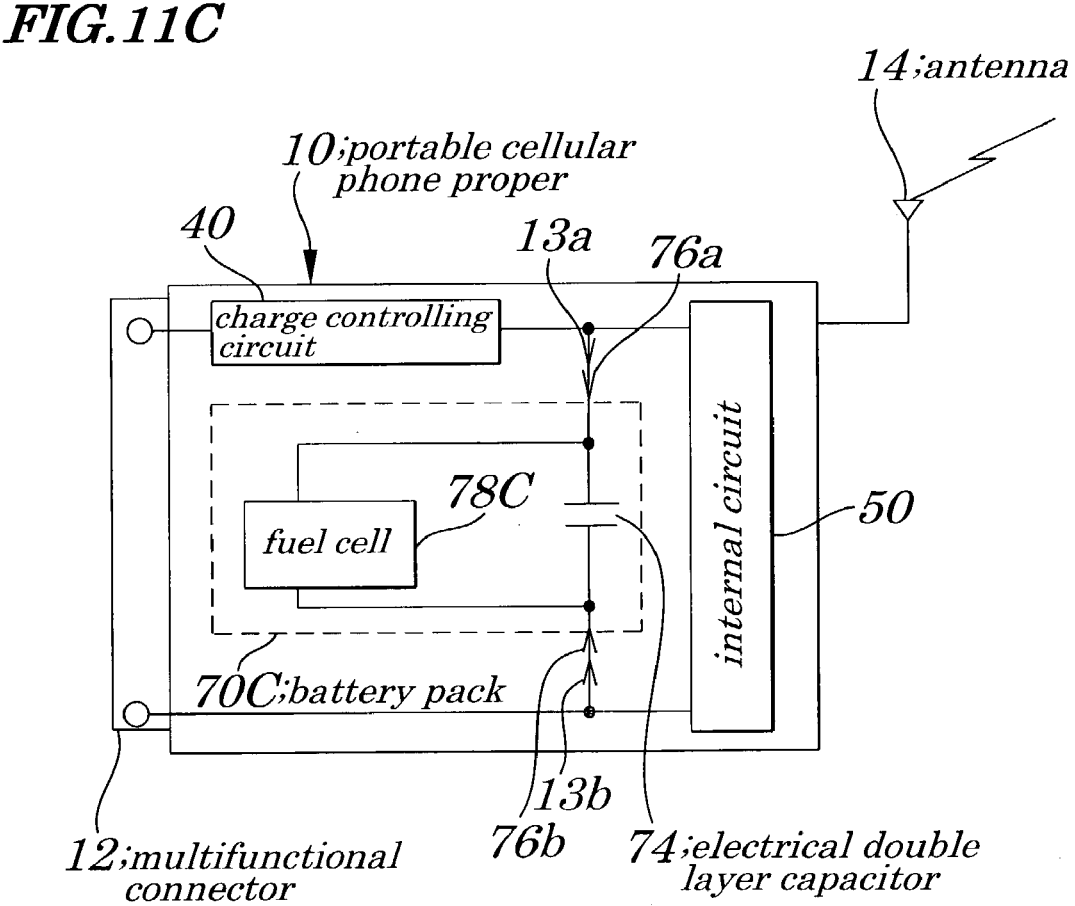

FIGS. 11A, 11B, and 11C are diagrams illustrating a portable cellular phone in which the battery pack 70C shown in FIG. 10A is placed in a portable cellular phone proper 10 of the fourth embodiment. In FIGS. 11A, 11B, and 11C, same reference numbers are assigned to components having same functions as those in FIGS. 8A, 8B, and 8C. As shown in FIG. 11C, in the battery pack 70C, instead of the fuel cell 78 shown in FIGS. 8C, a fuel cell 78C that can produce electromotive force being different from that in the fuel cell 78 is provided. The fuel cell 78C produces electromotive force having a voltage (for example, 4.5V) being same as that of a dedicated secondary battery 20 employed in the conventional case. To the fuel cell 78C is connected an electrical double layer capacitor 74 in parallel. In the embodiment, the electrical double layer capacitor 74 whose equivalent serial resistance is lower than that of the fuel cell 78C is used. The equivalent serial resistance is so set that use time of the fuel cell 78C is lengthened as much as possible by discharging the electrical double layer capacitor 74 preferentially rather than the fuel cell 78C while power consumption increases or decreases in a burst manner.

Next, operations of the battery pack 70C of the embodiment are described. A portable cellular phone 1 shown in FIGS. 12A and 12B is operated using the dedicated secondary battery 20 as a power source. However, in the fourth embodiment, if the dedicated secondary battery 20 of the portable cellular phone 1 is discharged, the battery pack 70C instead of the dedicated secondary battery 20 is used to supply power. That is, in the battery pack 70C, electromotive force having a voltage of 4.5V is produced by the fuel cell 78C. A voltage of the fuel cell 78C is applied to the electric double layer capacitor 74. Then, power is accumulated in the electrical double layer capacitor 74. The power is fed through terminals 76*a* and 76*b* from terminals 13*a* and 13*b* to the portable cellular phone proper 10. In the portable cellular phone proper 10, same operations as those in the first embodiment are performed. In this case, since an equivalent serial resistance of the electrical double layer capacitor 74 is lower than that of the fuel cell 78C, while power consumption increases or decreases in a burst manner, the electrical double layer capacitor 74 is preferentially discharged. Moreover, since almost no drop in a voltage of the electrical double layer capacitor 74 occurs even while power consumption increases or decreases in a burst manner, a message that a voltage of the fuel cell 78C has reached a final voltage even in a state in which a discharging depth of the fuel cell 78C is shallow does not appear on a display section of the portable cellular phone proper 10, capacity of the fuel cell 78C can be utilized to the fullest.

Thus, in the fourth embodiment, almost the same advantages as obtained in the second embodiment can be achieved. Additionally, since the battery pack 70C is provided with the fuel cell 78C, instead of alkaline accumulators 71, 72, and 77 employed in the conventional case shown in FIG. 6C, even when the fuel runs out, by supplementing the fuel, operations of the portable cellular phone can be immediately restored to its normal state. Moreover, since almost no drop in a voltage of the electrical double layer capacitor 74 occurs even while power consumption increases or decreases in a burst manner, capacity of the fuel cell 78 can be utilized to the fullest.

It is apparent that the present invention is not limited to the above embodiments but may be changed and modified without departing from the scope and spirit of the invention. For example, in each of the above embodiments, when a dedicated secondary battery 20 is discharged, battery packs 70, 70A, 70B, and 70C are placed instead of the dedicated secondary battery 20, however, the battery packs 70, 70A, 70B, and 70C may be mounted without using the dedicated secondary battery 20 from a first stage. Moreover, the two pieces of alkaline accumulators 71 and 72 may be one accumulator. However, in this case, a boosting-type DC/DC converter 73*b* must be so configured that a voltage of electromotive force of one alkaline accumulator is boosted to an output voltage U being same as a voltage of the dedicated secondary battery 20. Moreover, each of the alkaline accumulators may be, for example, manganese dioxide lithium cell, nickel hydrogen cell, or a like. Also, the electrical double layer capacitor 74 may be, for example, an aluminum electrolytic capacitor or a like. Also, in each of the above embodiments, battery cells 70, 70A, 70B, and 70C are placed in the portable cellular phone proper 10, however, may be placed not only in the portable cellular phone but also in a PDA (Personal Digital Assistance) containing functions of a portable cellular phone.

What is claimed is:

1. A primary battery pack for being used as an alternative power source of a portable cellular phone, said portable telephone comprising:
an internal circuit and
a battery mounting section for mounting a dedicated secondary battery therein,
wherein said dedicated secondary battery is so configured to be charged in a charging mode and to feed power to said internal circuit in an operating mode through a pair of common terminals provided in said battery mounting section,
said primary battery pack to be mounted in said battery mounting section in such a manner so as to be spatially replaceable with said dedicated secondary battery, said primary battery pack comprising:
a pair of connection terminals to be connected with said pair of said common terminals;
a power storing unit and a primary battery which are electrically connected between said pair of said connection terminals in such a manner that said power storing unit and said primary battery are electrically connected with each other in parallel;
a package for housing said primary battery and said power storing unit,
wherein said power storing unit and said primary battery are so configured to feed power in the operating mode to said internal circuit of the portable cellular phone through said pair of said common terminals;
a current limiting circuit to limit and output an electromotive force of said primary battery to a current level being a predetermined value or less;
a DC/DC (Direct Current/Direct Current) converter to boost a voltage of the electromotive force of said primary battery fed from said current limiting circuit to a voltage level of said dedicated secondary battery; and
a voltage detector to detect a voltage output from said DC/DC converter, to produce a negative feedback signal based on the detection result and to transmit the produced negative feedback signal to said DC/DC converter, the negative feedback signal being used to exert negative-feedback controlling on the voltage output from said DC/DC converter, and the voltage output from said DC/DC converter being fed to said power storing unit.

2. The primary battery pack according to claim 1, wherein said power storing unit is made up of an electrical double layer capacitor.

3. The primary battery pack according to claim 1, wherein said power storing unit comprises an electrical double layer capacitor has an equivalent serial resistance being lower than that of said primary battery.

4. The primary battery pack according to claim 1, wherein the portable cellular phone has an operating mode in which its power consumption increases or decreases in a burst manner.

5. The primary battery pack according to claim 2, wherein a thin and planar type of said electrical double layer capacitor and said primary battery are housed in said package in such a manner that on a bottom portion of said package, said electrical double layer capacitor is placed, and said primary battery is placed on said electrical double layer capacitor.

6. A primary battery pack for being used as an alternative power source of a portable cellular phone, said portable cellular phone comprising:
an internal circuit,
a battery mounting section for mounting a dedicated secondary battery therein, and
a charge controlling circuit for controlling charge of said dedicated secondary battery within said battery mounting section,
wherein said dedicated secondary battery is so configured to be charged by control of said charge controlling circuit in a charging mode and to feed power to said internal circuit in an operating mode through a pair of common terminals provided in said battery mounting section, said primary battery pack to be mounted in said battery mounting section in such a manner so as to be spatially replaceable with said dedicated secondary battery, said primary battery pack comprising:

a pair of connection terminals to be connected with said pair of said common terminals;

a power storing unit and a primary battery which are electrically connected between said pair of said connection terminals in such a manner that said power storing unit and said primary battery are electrically connected with each other in parallel;

a package for housing said primary battery and said power storing unit, wherein said power storing unit and said primary battery are so configured to feed power in the operating mode to said internal circuit of the portable cellular phone through said pair of said common terminals and not through said charge controlling circuit;

a current limiting circuit to limit and output an electromotive force of said primary battery to a current level being a predetermined value or less;

a DC/DC (Direct Current/Direct Current) converter to boost a voltage of the electromotive force of said primary battery fed from said current limiting circuit to a voltage level of said dedicated secondary battery; and a voltage detector to detect a voltage output from said DC/DC converter, to produce a negative feedback signal based on the detection result, and transmits the produced negative feedback signal to said DC/DC converter, the negative feedback signal being used to exert negative-feedback controlling on the voltage output from said DC/DC converter, and the voltage output from said DC/DC converter being fed to said power storing unit.

7. The primary battery pack according to claim 6, wherein said power storing unit comprises an electrical double layer capacitor.

8. The primary battery pack according to claim 6, wherein said power storing unit comprises an electrical double layer capacitor having an equivalent serial resistance being lower than that of said primary battery.

9. The primary battery pack according to claim 6, wherein the portable cellular phone has an operating mode in which its power consumption increases or decreases in a burst manner.

10. The primary battery pack according to claim 7, wherein a thin and planar type of said electrical double layer capacitor and said primary battery are housed in said package, in such a manner that on a bottom portion of said package, said electrical double layer capacitor is placed, and said primary battery is placed on said electrical double layer capacitor.

* * * * *